United States Patent
Benson et al.

(10) Patent No.: US 11,778,059 B1
(45) Date of Patent: *Oct. 3, 2023

(54) SYSTEMS AND METHODS FOR RECOGNIZING A DEVICE

(71) Applicant: ACCERTIFY, INC., Itasca, IL (US)

(72) Inventors: Glenn S. Benson, Newton, MA (US); Paul Marsolan, Santa Monica, CA (US); Christopher Guenther Moos, Scottsdale, AZ (US)

(73) Assignee: ACCERTIFY, INC., Itasca, IL (US)

( * ) Notice: Subject to any disclaimer, the term of this patent is extended or adjusted under 35 U.S.C. 154(b) by 139 days.

This patent is subject to a terminal disclaimer.

(21) Appl. No.: 17/126,465

(22) Filed: Dec. 18, 2020

Related U.S. Application Data

(63) Continuation of application No. 16/449,899, filed on Jun. 24, 2019, now Pat. No. 10,873,641, which is a continuation of application No. 15/053,362, filed on Feb. 25, 2016, now Pat. No. 10,334,062.

(51) Int. Cl.
*H04L 9/40* (2022.01)
*H04L 67/50* (2022.01)
*H04L 67/303* (2022.01)

(52) U.S. Cl.
CPC ............ *H04L 67/535* (2022.05); *H04L 63/08* (2013.01); *H04L 63/102* (2013.01); *H04L 67/303* (2013.01)

(58) Field of Classification Search
CPC ..... H04L 67/535; H04L 67/303; H04L 63/08; H04L 63/102
See application file for complete search history.

(56) References Cited

U.S. PATENT DOCUMENTS

| | | |
|---|---|---|
| 6,041,133 A | 3/2000 | Califano et al. |
| 6,185,316 B1 | 2/2001 | Buffam |
| 7,272,728 B2 | 9/2007 | Pierson et al. |
| 8,213,907 B2 | 7/2012 | Etchegoyen |
| 8,285,994 B2 | 10/2012 | Shah et al. |
| 8,312,157 B2 | 11/2012 | Jakobsson et al. |
| 8,316,421 B2 | 11/2012 | Etchegoyen |
| 8,590,021 B2 | 11/2013 | Steeves et al. |
| 8,817,984 B2 | 8/2014 | Miller et al. |
| 8,925,062 B1 * | 12/2014 | Brezinski ............... G06F 21/32 713/168 |

(Continued)

OTHER PUBLICATIONS

Adaptive Authentication for Enterprise, IAPRIORART00003020, 2009.

(Continued)

*Primary Examiner* — Khoi V Le
(74) *Attorney, Agent, or Firm* — Sterne, Kessler, Goldstein & Fox P.L.L.C.

(57) ABSTRACT

A system for detecting whether a device seeking communication with a server is a returning device that previously communicated with the server includes a database that stores groups of device attributes based on observable device characteristics and unique identifiers. The database is generally not accessible to the devices. Each attribute group and the associated device identifier (DID) can uniquely identify a particular device, and the associated DID is generally not derivable from the attributes. The database may satisfy a uniqueness property so that each attribute value in the database may also uniquely identify a device.

20 Claims, 16 Drawing Sheets

(56) References Cited

U.S. PATENT DOCUMENTS

| | | | |
|---|---|---|---|
| 8,961,619 B2 | 2/2015 | Gum | |
| 9,197,619 B2 * | 11/2015 | Agerstam | H04L 63/08 |
| 9,294,448 B2 * | 3/2016 | Miller | H04L 9/3271 |
| 9,559,852 B2 | 1/2017 | Miller et al. | |
| 9,722,804 B2 | 8/2017 | Miller et al. | |
| 10,237,073 B2 | 3/2019 | Benson | |
| 10,334,062 B2 | 6/2019 | Benson et al. | |
| 10,873,641 B2 | 12/2020 | Benson et al. | |
| 2002/0044651 A1 | 4/2002 | Tuvell | |
| 2005/0278542 A1 | 12/2005 | Pierson et al. | |
| 2006/0036862 A1 | 2/2006 | Tuvell et al. | |
| 2006/0041752 A1 | 2/2006 | Tuvell et al. | |
| 2006/0050869 A1 | 3/2006 | Tuvell et al. | |
| 2006/0282660 A1 | 12/2006 | Varghese et al. | |
| 2007/0173700 A1 * | 7/2007 | Ishihara | G06T 11/206 128/920 |
| 2007/0240217 A1 | 10/2007 | Tuvell et al. | |
| 2007/0240218 A1 | 10/2007 | Tuvell et al. | |
| 2007/0240219 A1 | 10/2007 | Tuvell et al. | |
| 2007/0240220 A1 | 10/2007 | Tuvell et al. | |
| 2007/0240221 A1 | 10/2007 | Tuvell et al. | |
| 2007/0240222 A1 | 10/2007 | Tuvell et al. | |
| 2008/0034439 A1 * | 2/2008 | Chen | H04L 63/105 726/27 |
| 2008/0086773 A1 | 4/2008 | Tuvell et al. | |
| 2008/0086776 A1 | 4/2008 | Tuvell et al. | |
| 2008/0196104 A1 | 8/2008 | Tuvell et al. | |
| 2009/0025084 A1 | 1/2009 | Siourthas et al. | |
| 2010/0229224 A1 | 9/2010 | Etchegoyen | |
| 2010/0296653 A1 | 11/2010 | Richardson | |
| 2010/0332400 A1 | 12/2010 | Etchegoyen | |
| 2011/0082768 A1 | 4/2011 | Eisen | |
| 2011/0093503 A1 | 4/2011 | Etchegoyen | |
| 2011/0179484 A1 | 7/2011 | Tuvell et al. | |
| 2011/0239273 A1 * | 9/2011 | Yang | H04L 43/028 709/224 |
| 2012/0030771 A1 | 2/2012 | Pierson et al. | |
| 2012/0042029 A1 | 2/2012 | Tuvell et al. | |
| 2012/0108173 A1 * | 5/2012 | Hahm | H04L 41/5058 455/41.2 |
| 2012/0201381 A1 | 8/2012 | Miller et al. | |
| 2013/0167196 A1 * | 6/2013 | Spencer | H04L 67/303 370/254 |
| 2013/0340052 A1 | 12/2013 | Jakobsson | |
| 2014/0068738 A1 * | 3/2014 | Harty | G06F 21/44 726/7 |
| 2014/0115160 A1 | 4/2014 | Tuvell et al. | |
| 2014/0173738 A1 * | 6/2014 | Condry | G06F 21/577 726/25 |
| 2014/0282933 A1 * | 9/2014 | Etch | H04L 63/08 726/5 |
| 2015/0033027 A1 | 1/2015 | Miller et al. | |
| 2015/0039513 A1 * | 2/2015 | Adjaoute | G06Q 30/0609 705/44 |
| 2015/0347753 A1 | 12/2015 | Tuvell et al. | |
| 2016/0005044 A1 * | 1/2016 | Moss | G06Q 20/4016 705/44 |
| 2016/0012227 A1 | 1/2016 | Tuvell et al. | |
| 2016/0204948 A1 | 7/2016 | Miller et al. | |
| 2016/0261416 A1 | 9/2016 | Miller et al. | |

OTHER PUBLICATIONS

RSA Solution Brief, RSA Adaptive Authentication, Offering Multiple Ways to Provide Strong Two-Factor Authentication to End Users, IAPRIOR ART00003043, 2008.

RSA Solution Brief, RSA Adaptive Authentication, Balancing Risk, Cost and Convenience, IAPRIORART00003024, 2008.

RSA Adaptive Authentication for Financial Services, IAPRIORART00003036, 2008-2009.

RSA Adaptive Authentication, http://web.archive.org/web20100102005728 http://rsa.com/node.aspx?id=3018; IAPRIORART00003040, Jan. 2, 2010.

RSA SecurID Software Token 4.1 Adminislalor's Guide, IAPRIORART00003047, Nov. 2009.

The RSA Authentication Decision Tree, IAPRIORART00003145, 2011.

Arcol RiskFort Fraud Detection, IAPRIORART00004119, Jan. 2, 2010.

Arcol RiskFort Fraud Detection, IAPRIORART00003337, Dec. 8, 2010.

Arcol RiskFort Fraud Dection and Prevention Data Sheet, IAPRIORART00003687, 2008.

Arcol RiskFort Administration Guide Version 2.2.6, IAPRIORART00003341, Sep. 2010.

Arcol RiskFort Installation and Deployment Guide (for Windows Platforms), IAPRIORART00003893, Sep. 2010.

Arcol RiskFort Installation and Deployment Guide (for Red Hal Enterprise Linux 4.0), IAPRIORART00003689, Mar. 2009.

Product Sheet: CA Areal RiskFort, IAPRIORART00003331, 2010.

Data Sheet: CA Risk Authentication, IAPRIORART00003 3 3 9, 2015.

How Unique is Your Web Browser, Peter Eckersley, Electronic Frontier Foundation, pde@eff.org, 2010.

Implicit Authentication Through Learning User Behavior, Elaine Shi, et al., 2010.

Implct Authentication for Mobile Devices, Markus Jakobsson et al., Aug. 2009.

International Preliminary Report on Patentability for International Application No. PCT/US2016/019618, dated Aug. 28, 2018 (13 pages).

Written Opinion for International Application No. PCT/US2016/019618, dated Feb. 13, 2017 (12 pages).

International Search Report for International Application No. PCT/US2016/019618, dated Feb. 13, 2017 (6 pages).

Hristo Bojinov et al., "Mobile Device Identification via Sensor Fingerprinting", Aug. 6, 2014 (Aug. 6, 2014), XP055235060, DOI: arXiv: 1408.1416 (pp. 1-14).

* cited by examiner

| Tuple No. | Device Data 105 | | | Public Key 106 | DID 210 |
|---|---|---|---|---|---|
| | Info1 | Info2 | Info3 | | |
| T1 | 1:2 | 22 | 15 | 34 | 182309 |
| T2 | 1:3 | 47 | 54 | 87 | 227239 |
| T3 | 2:2 | 22 | 8 | 19 | 392893 |
| T4 | 2:4 | 78 | 6 | 67 | 478299 |

FIG. 1

```
function match(k)

i <- 1
mtcho <- FALSE
while (mtcho == FALSE AND i <= R) {
  j <- 1
  mtchd <- FALSE
  while (mtchd == FALSE AND j <= C) {
    if (DB(i,j) == OBS(k,j) {
        THEN mtchd <- TRUE
        ELSE j <- j+1
    }
    mtcho <- mtchd
    if (mtcho == FALSE) i <- j+1
}
if (i > R)
  THEN match not found
  ELSE match found at row i if a match is found, then provide as a result, the DID found at
row i. Otherwise, allocate a new DID and add to the database.
```

FIG. 2A

```
mtchR <- 0
for (i in 1 to R) {
  mtchC <- FALSE
  for (j in 1 to C) {
    if (OBS(j) == DB(i,j)) mtchC <- TRUE
  }
  if (mtchC == TRUE) {mtchR <- mtchR + 1}
}
if (mtchR >= 2) {raise(spoofFlag)}
```

FIG. 2B

| DE1 | DE2 | Infs1 |
|---|---|---|
| 1 | 2 | 1:2 |
| 1 | 3 | 1:3 |
| 2 | 2 | 2:2 |
| 3 | 4 | 2:4 |

FIG. 3

| Domain X | Co-Domain Y |
|---|---|
| 1 | D |
| 2 | B |
| 3 | C |
| 4 | A |

| Domain X | Co-Domain Y |
|---|---|
| 1 | D |
| 2 | B |
| 3 | C |
| 4 | A |
| 5 | E |

| Domain<br>First Attribute | Second Attribute | Co-Domain Y |
|---|---|---|
| 1 | 101 | D |
| 2 | 102 | B |
| 3 | 103 | C |
| 4 | 104 | A |
| 5 | 105 | E |

FIG. 11

| First Attribute | Second Attribute | Co-Domain Y |
|---|---|---|
| 1 | 101 | D |
| 1 | 102 | B |
| 3 | 103 | C |

FIG. 12

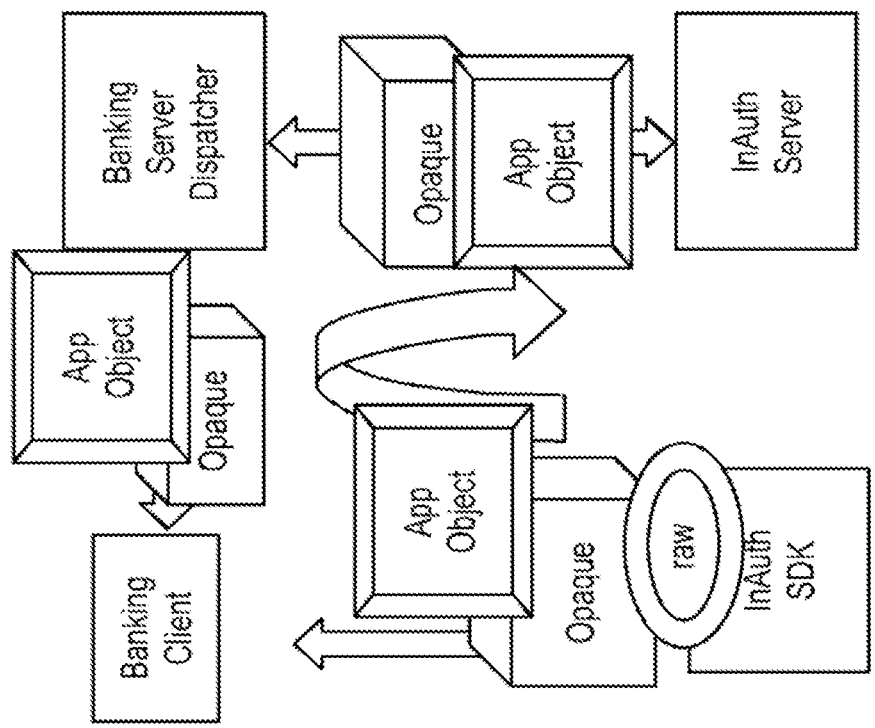
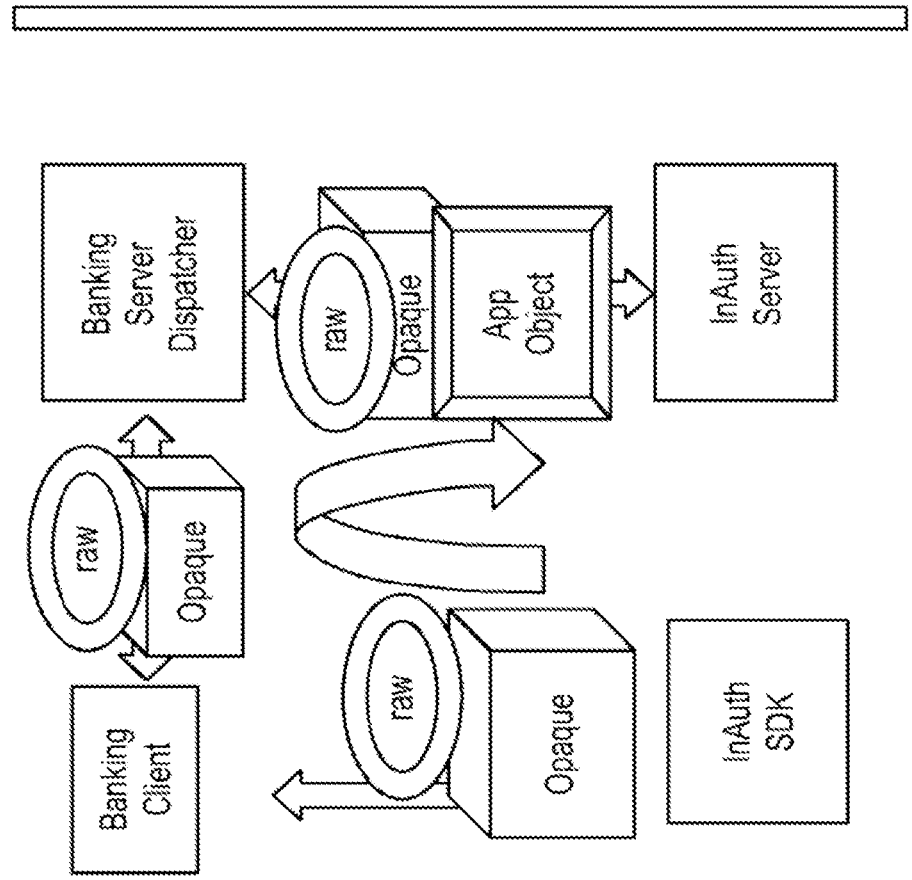
FIG. 27

SYSTEMS AND METHODS FOR RECOGNIZING A DEVICE

CROSS REFERENCE TO RELATED APPLICATIONS

This application is a continuation of U.S. patent application Ser. No. 16/449,899, filed on Jun. 24, 2019, which application is a continuation of U.S. patent application Ser. No. 15/053,362, filed on Feb. 25, 2016, now U.S. Pat. No. 10,334,062, the complete disclosures of which are incorporated herein by reference.

FIELD OF INVENTION

This disclosure generally relates to techniques for efficient and secure communication between a client device and a server and, in particular, to techniques for accurate, reliable determination by a server whether a device seeking communication has previously communicated with that server.

BACKGROUND

Service providers provide many different kinds of services to users via a communication network such as the Internet. Often, the users access these services using different devices. For example, a user may access a banking service via a laptop computer, a tablet, and a smart phone at different times and/or from different locations. Other examples include users watching movies or other content from an online content provider, and users accessing medical information, using different devices at different times and places. In order to provide such services, service providers often register the user devices. More than one device can be associated with a user, Such registration can allow a service provider to ensure that when a service request is received from a device, only an authorized user is in fact accessing the service. The likelihood of unauthorized access to sensitive user information, such as banking records, credit card transactions, medical records, online shopping records, etc., can also be minimized if the service provide can recognize a requesting device as that associated with an authorized user.

To facilitate device recognition, some systems collect and transmit device data to a service provider's server during the initial registration process. Such device data may include device characteristics such as a phone number, an identifier associated with circuitry of the device, an identifier associated with a carrier, a signature associated with a software component installed on the device, information about the operating system (OS) on the device, etc. The same device characteristics are collected and transmitted to the server again when the device is subsequently used to request a service. At the service provider's server, if the subsequently received data matches with the data stored at the server during the initial registration, the requesting device may be recognized as a returning device.

This technique encounters a number of problems, however. First, one or more device characteristics often change for legitimate reasons. For example, the OS may be upgraded and one or more other software components such as apps installed on the device may be removed or updated, Users may replace one carrier with another and, in some cases, may change a phone number associated with the device. Should any of the device characteristics that are used in device recognition change, the known techniques typically fail to recognize the device as a returning device. This may cause some inconvenience to the user. For example, the user may have to repeat the registration process.

Second, a malicious user (also called an adversary) can anonymize a device, causing the service provider's server to erroneously determine that a returning device is a new device, and use this error to the adversary's advantage. For example, an online content provider may run a promotion where the first visit to the content provider's service grants access to the content for free, while later visits would require a paid subscription. An adversary may change a particular device characteristic before each visit, so that the content provider's server fails to recognize that the device is actually a returning device and grants free access to the content to the adversary more than once.

Third, a malicious user (adversary) may spoof a device by replacing the device characteristics with those of another device. The service provider's server may erroneously determine that the requesting device is the other device, and may grant access to service and/or data relating to the user of the other device to the adversary.

The table below illustrates a characteristic of failure rates. The diagonal from top left to bottom right illustrates correct behavior. The other diagonal illustrates erroneous behavior. The rate at which a new device (device which has not yet been observed) is erroneously associated with an identifier (ID) of a returning device is the False Accept Rate (FAR). The rate at which a returning device is erroneously failed to be identified is the False Reject Rate (FRR).

|  | Identified with returning ID | Identified with new ID |
| --- | --- | --- |
| Returning Device | Correct | False reject rate |
| New Device | False accept rate | Correct |

The FAR and FRR may be attributed to either inadvertent issues in the identification solution, or portions of the FAR and FRR may be associated with attacks. A spoof attack contributes to the FAR because an adversary fools the system into attributing a different device's returning ID. An anonymization attack contributes to the FRR because the solution fails to re-identify a returning device.

SUMMARY

Various embodiments described herein feature robust protection against anonymization and/or spoofing while simultaneously providing a low FAR and FRR. This is achieved, in part, by maintaining a set of groups of device attribute values received from several devices, where each attribute value in the set may satisfy a uniqueness property. When a new group of device attribute values is received from a device, a search for a matching group in the set is performed. If only one matching group is found, the device from which the new group was received is determined to be a likely returning device. If more than one matching groups are found, where each matching group is associated with a different device, the device may be classified as a risky device. If no matching group is found, the device may be recognized as a new device and the received new group of attributes may be included in the set. As such, each group in the set can identify a different, respective device. A respective unique device identifier may be associated with each group of attribute values in the set. The unique device identifier is typically generated using a pseudorandom number generator, and the unique device identifier may not be derivable from any of the device attributes.

Accordingly, in one aspect, a method is provided for categorizing a device. The method includes the steps of receiving at a server from a device, device data associated with the device, the device including a number of attributes and designating the device as a returning device if (a) a first device attribute in the number of device attributes is included in a first attribute group within information accessible to the server; and (b) no other device attribute in the number of device attributes is determined to be included in an attribute group within the information other than the first attribute group: and otherwise designating the device as one of a new device and a risky device.

In some embodiments of the method, the first attribute group may be associated with a first device identifier (DID), the method further including identifying the device using the first DID.

In some embodiments of the method, a second device attribute in the number of attributes may also be included in the accessible information, the method further including retrieving from the accessible information a second attribute group that includes the second device attribute, determining that the second attribute group is the same as the first attribute group, and associating one of a designated high confidence score and a designated low risk score with the first DID. In some embodiments of the method, a second device attribute in the number of attributes may also be located in the accessible information, the method further including retrieving from the accessible information a second attribute group that includes the second device attribute, determining that the second attribute group is different from the first attribute group, and re-designating the device as a risky device.

In some embodiments of the method, a second device attribute in the number of attributes may also be located in the accessible information, the method further including retrieving from the accessible information a second attribute group that includes the second device attribute, determining that the second attribute group is different from the first attribute group, and associating one of a designated low confidence score and a designated high risk score with at least one of a first DID associated with the first attribute group and a second DID associated with the second attribute group.

In some embodiments of the method, a second device attribute in the number of device attributes is not located in the accessible information. In some embodiments of this case, the second device attribute represents a user-authorized change to a device property, the method further including storing the second device attribute in the first attribute group. Some embodiments of this case may include associating one of a designated high confidence score and a designated low risk score with a DID associate with the first attribute group. Some embodiments of this case may include associating one of a designated low confidence score and a designated high risk score with a DID associate with the first attribute group.

Some embodiments of the method may include designating the device as a new device if none of the number of device attributes is located in the accessible information, generating by the server a new DID, storing in the accessible information the number of device attributes as a new attribute group, and associating the new DID with the new attribute group. In some embodiments of this case, generating the new DID includes generating the new DID using a random number generator and/or a pseudo-random number generator. In some embodiments of this case, the new DID is generated independently of any of the number of device attributes. In some embodiments of this case, associating one of a designated high confidence score and a designated low risk score with the new DID if no data element corresponding to the number of device attributes is inconsistent with any other data element corresponding to the number of device attributes, and otherwise: (i) associating one of a designated low confidence score and a designated high risk score with the new DID, and (ii) re-designating the device as an attempted anonymized device.

In some embodiments of the method, the first device attribute is based on at least one of a phone number, a mobile equipment identifier, a parameter of an operating system installed on the device, a model number of the device, a serial number of the device, a device characteristic, a public key allocated to the device, and a public key installed on the device.

In some embodiments of the method, the receiving step includes receiving the first data element via digitally signed message. In some embodiments of this case, the message includes (i) a first information object including the first device attribute, (ii) a header object including at least one of an anti-replay header and an anti-tamper header, and (iii) an integrity object including a signature associated with the first information object, the method further including validating the secured object based on the signature. The number of device attributes may include a public key used for validating the digital signature. In some embodiments, this case includes performing by the server at least one of: (i) an anti-replay check, and (ii) an antitamper check, and validating the secured object according to a result of at least one of: (i) the antireplay check, and (ii) the anti-tamper check.

In another aspect, a system is provided for facilitating the categorization of a device. The system includes a first processor and a first memory in electrical communication with the first processor. The first memory includes instructions that can be executed by a processing unit including the first processor or a second processor, or both. The processing unit may be in electronic communication with a memory module that includes the first memory or a second memory, or both.

The instructions program the processing unit to receive from a device, device data associated with the device, the device data including a number of device attributes designate the device as a returning device if: (a) a first device attribute in the number of device attributes is included in a first attribute group within information accessible to the server; and (b) no other device attribute in the number of device attributes is determined to be included in an attribute group within the information other than the first attribute group; and otherwise designate the device as one of a new device and a risky device.

In some embodiments of the system, the first attribute group is associated with a first device identifier (DID), the instructions further program the processing unit to identify the device using the first DID. In some embodiments of this case, a second device attribute in the number of device attributes is also included in the accessible information, the instructions further program the processing unit to retrieve from the accessible information a second attribute group that includes the second device attribute, determine that the second attribute group is same as the first attribute group, and associate one of a designated high confidence score and a designated low risk score with the first DID. In some embodiments of this case, a second device attribute in the number of device attributes is also located in the accessible information, the instructions further program the processing unit to retrieve from the accessible information a second attribute group that includes the second device attribute, determine that the second attribute group is different from the first attribute group, and re-designate the device as a risky device. In some embodiments of this case, a second device attribute in the number of device attributes is also located in the accessible information, the instructions further program the processing unit to retrieve from the accessible information a second attribute group that includes the second device attribute, determine that the second attribute group is different from the first attribute group, and associate one of a designated low confidence score and a designated high risk score with at least one of a first DID associated with the first attribute group and a second DID associated with the second attribute group. In some embodiments of this case, a second device attribute in the number of device attributes is not located in the accessible information.

In some embodiments of the above described case, the second device attribute represents a user-authorized change to a device property, the instructions further configure the processing unit to store the second device attribute in the first attribute group. In some embodiments, the instructions further program the processing unit to associate one of a designated high confidence score and a designated low risk score with a DID associated with the first attribute group. In some embodiments, the instructions further program the processing unit to associate one of a designated low confidence score and a designated high risk score with a DID associated with the first attribute group.

In some embodiments of the system, the instructions further program the processing unit to designate the device as a new device if none of the number of device attributes is located in the accessible information, generate by the server a new DID, store in the accessible information the number of device attributes as a new attribute group, and associate the new DID with the new attribute group. In some embodiments of this case, to generate the new DID, the instructions further program the processing unit to generate the new DID using at least one of a random number generator and a pseudo-random number generator. In some embodiments, the processing unit is programmed to generate the new DID independently of any of the number of device attributes. In some embodiments of this case, the instructions further program the processing unit to associate one of a designated high confidence score and a designated low risk score with the new DID if no data element corresponding to the number of device attributes is inconsistent with any other data element corresponding to the number of device attributes, and otherwise: (i) associate one of a designated low confidence score and a designated high risk score with the new DID, and (ii) re-designate the device as an attempted anonymized device.

In some embodiments of the system, the first device attribute may be based on at least one of a phone number, a mobile equipment identifier, a parameter of an operating system installed on the device, a model number of the device, a serial number of the device, a device characteristic, a public key allocated to the device, and a public key installed on the device.

In some embodiments of the system, the processing unit is programmed to receive the first data element via a digitally signed message. In some embodiments, the message includes (i) a first information object including the first device attribute, (ii) a header object including at least one of an anti-replay header and an anti-tamper header, and (iii) an integrity object. An integrity object may include a digital signature associated with the first information object, the instructions further program the processing unit to validate the secured object based on the digital signature. In some embodiments, the number of device attributes may include a public key used for validating the digital signature. In some embodiments, the instructions further program the processing unit to perform, by the server, at least one of: (i) an anti-replay check, and (i) an anti-tamper check; and validate the secured object according to a result of at least one of: (i) the anti-replay check, and (i) the anti-tamper check.

In another aspect, an article of manufacture is provided for facilitating the categorization of a device. The article includes a non-transitory storage medium having stored therein instructions which, when executed by a processing unit, program the processing unit, which is in electronic communication with a memory module, to receive from a device, device data associated with the device, the is device data including a number of device attributes. The instructions further program the processing unit to designate the device as a returning device if: (a) a first device attribute in the number of device attributes is included in a first attribute group within information accessible to the server: and (b) no other device attribute in the number of device attributes is determined to be included in an attribute group within the information other than the first attribute group; and otherwise designate the device as one of a new device and a risky device. In various embodiments, the instructions can program the processing unit to perform one or more of the method steps described above.

In another aspect method is provided for identifying a device. The method includes the steps of: maintaining a sequence of functions, each function in the sequence mapping a domain including a number of stored tuples of attribute values of devices to a number of pseudo-randomly generated identifier values in a respective co-domain; and boolean testing: (a) to produce a failed result if in a received tuple including a first attribute value and a second attribute value, the first attribute value is determined to belong to a first stored tuple, and the second attribute value is determined to belong to a second stored tuple different from the first tuple, and (b) to produce a successful result otherwise.

In some embodiments of the method, the failed result is produced, the method further includes designating the received tuple a risky tuple. In some embodiments of the method, the risky tuple is associated with at least one of a designated low confidence score and a designated high risk score. In some embodiments of the method: (i) both the first and second attribute values are determined to belong to the first stored tuple, (ii) a first function in the sequence of function maps the first tuple to a first device identifier (DID), and (ii) the successful result is produced, the method further including: designating a device associated with the received tuple a returning device; and identifying the returning device using the first DID.

In some embodiments of the method: (i) the first attribute value is determined to belong to the first stored tuple, (ii) the second attribute value is determined not to belong to any stored tuple in the number of stored tuples, and (iii) the successful result is produced, the method further including: designating a device associated with the received tuple a returning device; and updating the first stored tuple with the second attribute value.

In some embodiments of the method: ( ) both the first and the second attribute values are determined not to belong to any stored tuple in the number of stored tuples, and (ii) the successful result is produced, the method further including: updating the domain by adding thereto the received tuple; generating a new function mapping the updated domain to an updated number of pseudo-randomly generated identifier values in a second co-domain including at least one identifier value that is not in the first co-domain; and adding the new function to the sequence. In some embodiments of the previously described case: the new function represents a new set of mappings including a first set of mappings according to the first function; and a number of mappings in the new set of mappings is one greater than a number of mappings in the first set. In some embodiments of the method each identifier value is unique.

In another aspect, a system is provided for facilitating the identification of a device. The system includes a first processor and a first memory in electrical communication with the first processor. The first memory includes instructions that can be executed by a processing unit including the first processor or a second processor, or both. The processing unit may be in electronic communication with a memory module that includes the first memory or a second memory, or both. The user device may include a processing unit.

The instructions program the processing unit to maintain a sequence of functions, each function in the sequence mapping a domain including a number of stored tuples of attribute values of devices to a number of pseudo-randomly generated identifier values in a respective co-domain; and to perform a boolean test: (a) to produce a failed result if in a received tuple including a first attribute value and a second attribute value, the first attribute value is determined to belong to a first stored tuple, and the second attribute value is determined to belong to a second stored tuple different from the first tuple, and (b) to produce a successful result otherwise.

In some embodiments of the system, the failed result is produced, the instructions further program the processing unit to designate the received tuple a risky tuple. In some embodiments of the system, the risky tuple is associated with at least one of a designated low confidence score and a designated high risk score. In some embodiments of the system: (i) both the first and second attribute values are determined to belong to the first stored tuple, (ii) a first function in the sequence of function maps the first tuple to a first device identifier (DID), and (ii) the successful result is produced, the instructions further program the processing unit to: designate a device associated with the received tuple a returning device: and identify the returning device using the first DID.

In some embodiments of the system: (i) the first attribute value is determined to belong to the first stored tuple, (ii) the second attribute value is determined not to belong to any stored tuple in the number of stored tuples, and (iii) the successful result is produced, the instructions further program the processing unit to designate a device associated with the received tuple a returning device and to update the first stored tuple with the second attribute value.

In some embodiments of the system (i) both the first and the second attribute values are determined not to belong to any stored tuple in the number of stored tuples, and (ii) the successful result is produced. The instructions may further program the processing unit to: update the domain by adding thereto the received tuple; generate a new function mapping the updated domain to an updated number of pseudo-randomly generated identifier values in a second co-domain, including at least one identifier value that is not in the first co-domain: and add the new function to the sequence. In some embodiments, the new function represents a new set of mappings including a first set of mappings according to the first function; and the number of mappings in the new set of mappings may be one greater than the number of mappings in the first set. In some embodiments of the system, each identifier value is unique.

In another aspect, an article of manufacture is provided for facilitating the categorization of a device. The article includes a non-transitory storage medium having stored therein instructions which, when executed by a processing unit, program the processing unit, which is in electronic communication with a memory module, to maintain a sequence of functions, each function in the sequence mapping a domain including a number of stored tuples of attribute values of devices to a number of pseudo-randomly generated identifier values in a respective co-domain; and to perform a boolean test: (a) to produce a failed result if in a received tuple including a first attribute value and a second attribute value, the first attribute value is determined to belong to a first stored tuple, and the second attribute value is determined to belong to a second stored tuple different from the first tuple, and (b) to produce a successful result otherwise. In various embodiments, the instructions can program the processing unit to perform one or more of the method steps described above.

BRIEF DESCRIPTION OF THE DRAWINGS

In the drawings, like reference characters generally refer to the same parts throughout the different views. In the following description, various embodiments of the present invention are described with reference to the following drawings, in which:

FIG. 1 depicts an example database that stores device data, according to some embodiments;

FIG. 2A shows an algorithm for determining if an observation/device data received from a device represents a returning device, according to some embodiments;

FIG. 2B shows an algorithm for determining if an observation/device data received from a device represents a spoofing attack, according to some embodiments;

FIG. 3 illustrates formation of attributes satisfying a uniqueness property from data elements associated with devices, according to some embodiments;

FIG. 11 depicts a database corresponding to a function, according to some embodiments;

FIG. 12 depicts a database corresponding to a function, according to some embodiments;

FIG. 27 illustrate different modes of transmission of information between a data-collection module and a server, with one or more untrusted intermediaries, according to some embodiments.

DETAILED DESCRIPTION

Figure 4:
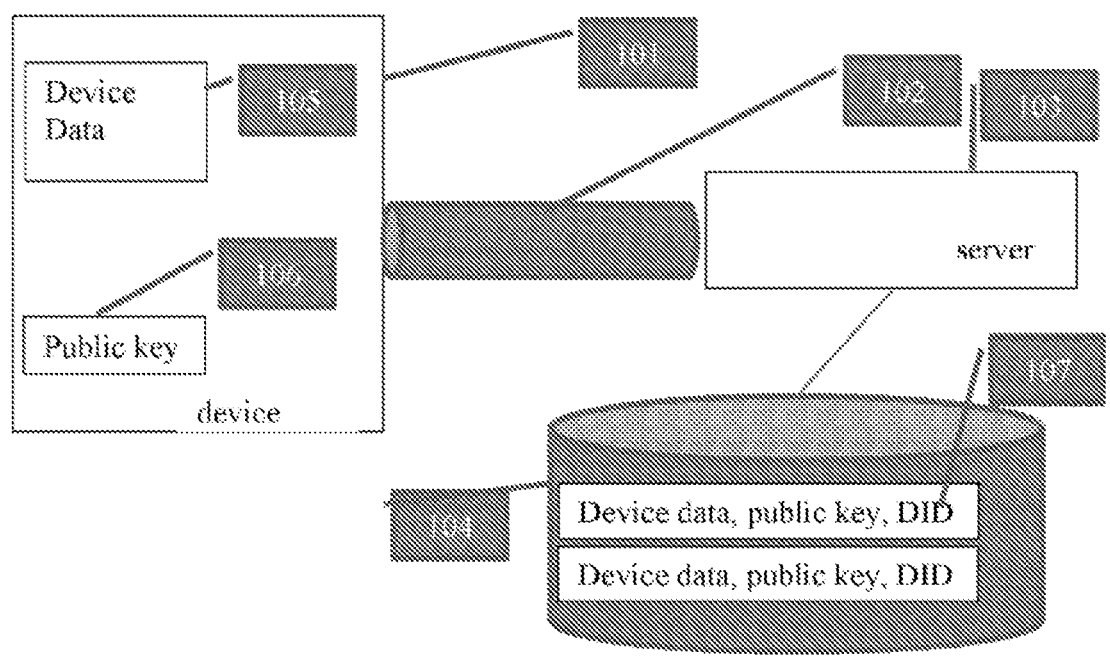
FIG. 4 depicts a system for identification of a returning device, according to some embodiments.

Referring to FIG. 1, a device identifier (DID) 210 is a randomly generated number that a server generates. The server may maintain a list of such randomly generated DID 210 numbers in a database. Associated with each randomly generated DID 210 number on the server's database is collection of tuples of observed device data 105. For example, consider an example database that has tuples, where each tuple includes four data elements: three attributes of device data (Info1, Info2, and Info3), and one public key associated with a device. The attribute values in the observations received at a server (the received tuple) and the tuples stored in a database may include alphanumeric characters and special characters such as the colon, hyphen, exclamation mark, etc. The public and/or private keys used in asymmetric cryptography are generally long, e.g. 2048 bits for an RSA public/private key pair, and include an exponent and a modulus. For the convenience of discussion only, the public key examples provided in this disclosure are short, e.g. a few digits. However, these examples are illustrative only and, in general, a public key can be a key of any suitable length and may have the format of a public key or public key certificate, e.g., PKCS #1.

Suppose the server receives a tuple RT that includes a single device attribute "Info1" having a value "2:2" from a device. The tuple RT can be represented as <"2:2" NULL, NULL, NULL> or as Info1:<2:2>. In various embodiments, the server performs a match and determines that the received attribute Info1 in the received tuple RT matches with the tuple T2 in the database having the Info1 value equal to 2:2. The public key on the device from which the tuple RT was sent was wiped and, as such, the received tuple RT does not include a public key associated with the device. Therefore, the server does not find a match for the public key in the tuple T2 The attributes Info2 and Info3 of the tuple T2 also do not match with the corresponding attributes of the received tuple RT, because these attributes are not included in the tuple RT. However, the server is able to identify that the DID corresponding to the device sending the tuple RT is 392893 because at least one attribute matched, and no other attribute in the received tuple matched with any tuple other than the tuple T2 in the database.

As the example above indicates, an adversary can wipe the public key, and may change some of the collected device information. As long as some of the collected information remains unchanged and is transmitted to the server, the server may continue to identify the DID 392893. If all of the device information changes, a new DID may be allocated. However, if the operating system (OS) upgrade causes a change to every device information element 105, but the user does not wipe the public key, then a new DID would not be allocated. Alternatively, if the OS upgrades and some but not all of the device data remains unchanged, a new DID would not be allocated regardless of whether or not the user wiped out the public key. For example, users who are not adversaries typically do not change the phone number on the mobile device. Such users may wipe their device and upgrade their OS, but the DID would not change because the phone number matched.

In the known systems, if any of the fields in the received device data 105 change, the device sending the device data is not recognized as a returning device and a new DID may be allocated to the device. In various embodiments, however, a new DID is not allocated to a device unless all of the device data fields/attributes change. As such, these embodiments are more likely to detect and identify a returning device because the adversary must change all attributes values as opposed to just one or a few.

In some embodiments, let DB[r,c] indicate the value of Info-c in the $r^{th}$ row of a database table. Suppose the database table has R rows and C columns of attributes. Consider the DID as the $(C+1)^{th}$ column of the table, where the table has a total of C+1 columns, in some embodiment, the detection process considers a public key associated with a device as another observed attribute, e.g., Info-C. Let OBS(k,c) indicate the value of Info-c, in the $k^{th}$ observation. Each observation has C data elements/attribute values.

In some embodiments, an algorithm shown in FIG. 2A is executed to determine a DID for the device from which observations are received. An advantage of this algorithm is that it computes a logical OR operation over several observed elements/attribute values, while the known systems generally consider the entire received observation as a single element. As a result, various embodiments can retrieve a DID that was previously assigned to the device even if some, but not all of the observed elements change. According to the known techniques, the previously allocated DID can be retrieved only if all the observed elements remain unchanged. As such, the implementation of various embodiments is more resilient to changes in the device data 105.

With reference to FIG. 2B, in some embodiments, when the server receives the $k^{th}$ observation, the server determines if that received observation is a spoof attack. The server may validate the observation by ensuring that no two different groups of observations, such as tuples, rows, etc., in a database have attributes that match two or more attributes in the observation. In some embodiments, the server can perform this operation using a database scan for spoof as described in the procedure shown in FIG. 2B. If the spoof-Flag is raised, the server may return a high risk indicator, and may not insert the received observation (OBS) into the database. If the spoofFlag is not raised, the server may continue to insert the observation into the database.

The algorithm shown in FIG. 2 assumes that each column is unique, i.e. no two values corresponding to any attribute, that are stored in two different rows of the database table, and would thus correspond to two different devices, are identical. In some cases, one or more data elements observed from a device, e.g. DE1 and DE2, may not be unique over all devices. For example, the OS version or the date of installation of a software patch may not be unique. In other words, two different devices can have exactly the same values for each of the data elements DE1 and DE2. However, as shown in FIG. 3, if no two devices have identical values for DE1 and DE2 simultaneously, these two data elements can be combined, e.g., concatenated, to obtain an attribute having unique values. As shown in FIG. 3, the values of the attribute Info1, which is a concatenation of the data elements DE1 and DE2, are unique. In some embodiments, one or more information or device attribute used by the Algorithm shown in FIG. 2 are computed by concatenating two or more (e.g., 3, 4, 5, etc.) data elements that are directly observed from the device with a delimiter such as a colon, comma, hyphen, space, separating each data element. A spoof scan followed by the operation to insert the received observation into the database can be a slow operation. The algorithms depicted in FIGS. 2A and 2B illustrate the desired operations, but implementations that combine and/or reorder these operations to optimize database operations and increase the overall computation efficiency are contemplated. In some embodiments, the server translates the spoofFlag into a high risk flag or a flag with a high risk score. In some embodiments, the server translates the spoofFlag into a low confidence flag, or a flag with a low confidence score.

An application can query a device for device data 105 or data elements from which the device data can be generated. Examples of such attributes and/or data elements include the device's phone number, if the device is a mobile phone, a unique serial number for the device or Mobile Equipment ID, or information obtained when querying for information known to the telecom or wireless carrier about the device. The information that can be queried from the device need not be permanent. For example, a user may request the carrier to change the phone number of the device.

After the device data is collected, a hacker can change it prior to and/or during the transmission of the device data to the server. In some embodiments, even if the hacker changes some data elements/attribute values, as long as one or more data elements/attribute values are not changed, various embodiments described above can correctly identify the returning device. With reference to FIG. 4, in some embodiments, the hacking can be prevented or the likelihood thereof can be minimized. In addition or alternatively, a hacking attempt can be detected and reported to the server. A device 101 communicates over a network such as the Internet to a server 103. The communication is through a trusted path 102 which can provide protection against man-in-the-middle attacks. The formation of trusted path is described in details in U.S. patent application Ser. No. 15/000,913, entitled "Systems and Methods for Trusted Path Secure Communication," filed on Jan. 19, 2016, the entire contents of which are incorporated herein by reference. The server 103 accesses a database 104, The database 104 is accessible to the server, but no device 101 can interact with the database directly.

Figure 5:
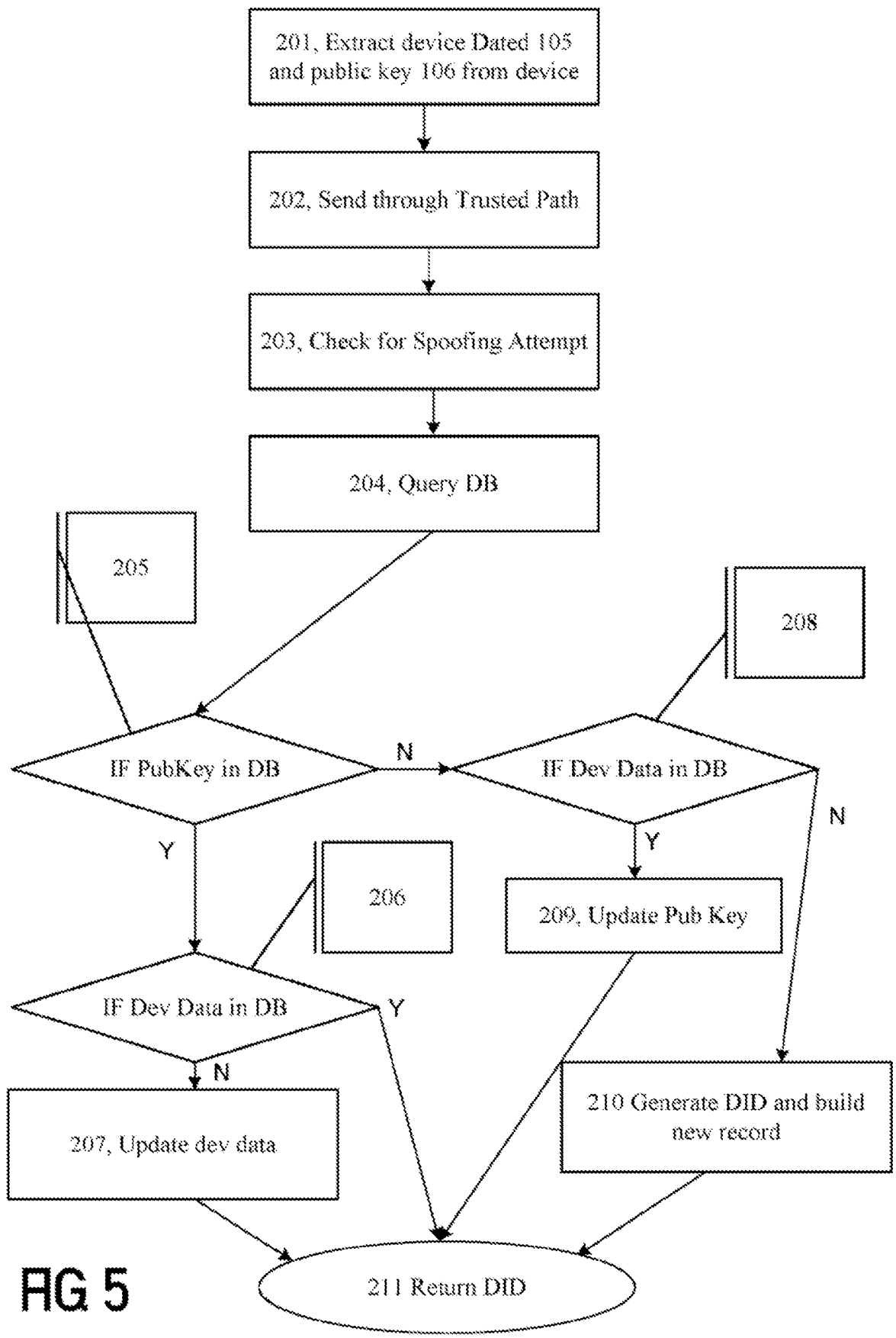
FIG. 5 illustrates a process for identification of a returning device, according to some embodiments.

The device 101 has information that can be queried by software operating on the device. Device data 105 is unique to the device, i.e., no other device may have exactly the same combination of device data values. The server 103 has access to a database 104, which includes a table of records 107. In some embodiments, the table 107 with at least three attributes, which may include device data, public key associated with a device, and a DID. A process according to one embodiment for identifying a device identifier is illustrated in the flow chart in FIG. 5.

Step 201: The device 101 interrogates itself to obtain device data 105 and a public key 106.

Step 202: The device 101 sends the device data 105 and public key 106 to the server 103 through a trusted path 102.

Step 203: The server optionally executes the algorithm shown in FIG. 2B. If the server determines that the spoofFlag should be raised, then the server raises the spoofFlag and stops. Otherwise, continues to the remaining steps of the process shown in FIG. 5.

Step 204: The server 103 queries the database table 107.

Step 205: IF the public key 106 already exists in the database table 107, THEN: The server 103 locates the record with the matching public key 106 value.

Step 206: IF the record contains device data that matches the received device data 105, Step 211: THEN: The server obtains the DID from the same record, and returns the DID as the unique identifier for the device.

Step 207: ELSE: The server updates the record by replacing the device data value in the database record with the received device data 105 obtained from the device.

Step 211: The server obtains the DID from the same record and returns the DID as the unique identifier for the device. This situation can occur, e.g., after an operating system upgrade.

Step 208: ELSE (i.e., public key 106 does not exist in the database table 107): IF the one or more attributes of the device data 105 already exists in the database table 107, Step 209: THEN: the server 103 locates the record. The server updates the record by replacing the public key value in the database table 107 for the located record with the public key 106 obtained from the device and replacing the device data in the database table 107 for the record with the device data 105 obtained from the device. This situation can occur when the device has been wiped so that a public key that was previously associated with the device is lost, deleted, or removed from the device 101. At least one attribute of the device data 105, however, remains the same as that was collected previously, in this particular situation.

Step 210: ELSE (i.e., neither the public key 106 nor any attribute in the device data 105 is found in the database table 107): The server inserts a new record into the database table 107. The database record may include the value of the received device data 105 obtained from the device, the public key 106 obtained from the device, and a newly generated random number which represents a newly generated DID. The random number is selected to be long enough (e.g., 64, 128, 256, 512 bits, etc.) to render it extremely unlikely of colliding with a previously-generated random number. A pseudo-random number generator may be used to generate the random numbers, where the pseudo-random number generator creates random-appearing values that are unpredictable (or difficult to predict) given the history of pseudo-randomly generated numbers. In some embodiments, the database can ensure DID uniqueness by rejecting any colliding DIDs.

Step 211: The server returns the newly generated random number, designated as DID, as a unique identifier for the device. This situation can occur when the server is contacted by a new device for the first time. The server may have no record of the public key 106 and the device data 105.

In some embodiments steps 206 and 208 use the Algorithm shown in FIG. 2A for finding the matching records in the database table 107.

Some embodiments employ a secure, trusted path from a device sending the observations to a server as an integral component of the solution to determine a DID for the device. A secure object that carries the device data 105 and the public key 106 is digitally signed by software operating on the device 101 using the private key that corresponds to the public key 106. When the secure object is received, the server 103 may validate the digital signature of the secure object using the public key of the device. As such, the public key that is associated with the device 101 and that is stored in the database table 107 is the public key that can be used to validate digital signatures computed by the private key (not shown) stored on the device 101. In various embodiments, no two devices 101 share the same private key.

In various embodiments, the trusted path can protect against the adversary changing the device data 105 and/or the public key 106 after the information is queried from the device, but before it is received and processed by the server. To this end, a security module installed on a device can additionally protect non-volatile storage on the device, and a data collection module also installed on the device can generate a secured object that includes and protects device data to be transmitted to the server using public and/or private keys obtained from the security module. The transmission of the secured object from the device to the server creates a trusted path 102 between the device and the server. An adversary generally cannot change the value of the public/private key(s) used to create a secured object without modifying the data collection and/or security modules. Any such tampering can be detected, however, using anti-tamper information included in the secured object. The security module can be protected using obfuscation/anti-tamper software that makes the security module difficult to tamper and reverse-engineer.

The integrity check associated with a secure object and obfuscation of the code of the data collection and/or security modules can decrease the likelihood of a successful modification of these modules by an adversary. In some embodiments, the code of these modules is implemented in the "C" language in order to ensure that the code can be well obfuscated by the obfuscation/anti-tamper techniques.

In some embodiments, the security module may include controls that protect a public/private key pair from being moved from one device to another. In this is attempted, the public/private key pair would not be decrypted and could not be used outside the trusted path 102 or to create a different trusted path. The public key used by the server to validate the digital signature of the secured object(s) sent from the device 101 is the public key 106.

In some cases, if a vendor upgrades the operating system installed on the device 101, the device data 105 obtained from the device may change its value. However, the operating system upgrades do not generally impact user data stored in the file system. Therefore, the public key 106 may not change its value. The process described above with reference to FIG. 5 and/or the algorithm described with reference to FIG. 2A can find the correct DID and update the database record with the new device data for future use. The test for device data (DevData) in the database DB depicted in FIG. 5 generally refer to one or more attributes of DevData.

If the user wipes the device, the public key 106 may be lost or deleted. However, the device data 105 may remain unchanged. As such, various embodiments described above can find the correct DID. A new public key 106 for the device may be generated by the server, a third party system, or by the device, and can be communicated to/from the device 101 from/to the server 103 via a trusted path 102 or a conventional communication path which then is used to establish a trusted path 102. The new public key 106 would be associated with the DID for the device, and the database may be updated to store the new public key for future use.

If the user or an adversary forges device data 105, the forging would typically require rooting or jailbreaking the device. The data collection module or another software module installed on the device 101 can detect the root and/or jailbreak, and may send the detection result to the server through the trusted path 102. The user/adversary generally cannot change the detection result in a man-in-the-middle attack because the trusted path protects against such attacks via anti-tamper and/or anti-replay checks. Should forged data be received at the server, the server can also determine that rooting or jailbreaking occurred by analyzing the anti-tamper information in the secured object, and may ignore such data.

An adversary may attempt an attack by wiping the device and changing all of the device data 105. If successful, the adversary may defeat the solution offered by various embodiments by obtaining either a newly generated DID for his or her device, or by obtaining a DID which actually belongs to a different device. As a countermeasure, some embodiments provide one or more confidence scores and/or one or more risk scores that can be used in conjunction with or instead of the DIDs.

For example, in when a device registers with the server, the server calculates the DID, as described above. If the device does not already have a public key, then the server ensures that the database table records the new public key for the device. In addition, the server generates one or more confidence scores ranging from a designated LOW value to a designated HIGH value, e.g., between 0 and 100. If a confidence score is HIGH, then the server believes that the DID is legitimate. If a confidence score is LOW, the server believes that an adversary is attempting to obtain the DID. An intermediate value may indicate that the server is not sure about its determination.

Suppose for example, the adversary launches an attack by wiping the public key, and additionally changing all of the device data 105 to newly values that have never previously been observed by the server. According to various embodiments described above, the server would find no match for any of the device data 105 and for the public key (as none would be received from the device). As such, the server generates a new randomly generated value for the DID. The adversary may thus defeat the solution described above because the DID of the device changed from a previously assigned value to the newly generated value. However, as described below, in some embodiments, the server detects a probable attack, for example, by identifying that the device was rooted or jailbroken and indicates this detection in the form of one or more confidence and/or one or more risk scores.

If a confidence score is less than HIGH and/or the risk score is greater than a designated LOW value, the server may execute a step-up authentication. For example, the server may refuse to register the device and, instead, require additional interaction with the user/owner of the device before deciding upon next steps. The server may perform many different types of risk analysis to produce one or more confidence and/or one or more risk scores. In some embodiments, a confidence and/or a risk score is computed using one of the techniques below:

Invalid attribute: Suppose one of the observed values was a manufacturer's model number, and another observed value was a manufacturer's serial number. Suppose that that the server's risk engine understands the range of serial numbers associated with the model number, but this information is not known to the adversary. In this case, the server realizes that the model number/serial number combination is not possible, so the server allocates a low confidence score such as zero.

Multiple match: If the server identifies multiple matches of different observed information, then the server may allocate a low confidence score. Referring to FIG. 1, suppose, for example, the server received the following attribute values: Info1: 1:2, Info2: 47, and Info3: 1000. In this case, the server matches 1:2 with tuple T1 and identifies a DID=182309. However, the confidence score is zero because the server additionally identifies a second match for tuple T2 (for the attribute Info2 having the value 47) with DID=227239.

Invalid format: A particular field may have a specified format guaranteed by the device's manufacturer. For example, a field may include numbers and lower case letters. However, if the data received from a device were to include an upper case letter, then the server may generate a low confidence score.

Invalid ancillary data: The data leveraged by the server to calculate a risk score may not be limited to the device data 105. The server may collect additional data from the device, where the additional data need not be unique. The adversary may not know the purpose of the data collection, so the adversary may attempt to fool the server by changing the ancillary data. If the adversary changes the ancillary data to a value that raises a level of concern, then the server may lower the confidence score. For example, suppose the server observes a particular model number for the device, and additionally observes the screen size of the display. The server references a database which identifies the actual screen sizes for each model. However, the adversary may not be aware of this database and inadvertently provide a screen size that was never actually built by the manufacturer. The server can determine this inconsistency and may assign a high risk score and/or a low confidence score to the received device data.

In some embodiments, the server establishes a threshold confidence score, and does not register any device with a confidence score below the threshold. In other embodiments, the server uses multiple confidence scores corresponding to different categories of assessment described above, and does not register a device if any of the confidence scores are below the threshold. One confidence score may be generated using a spoofFlag. Alternatively or in addition, a confidence score may be generated using the invalid ancillary data analysis (e.g. root or jailbreak detection). Alternatively or in addition, a confidence score may be generated using the invalid format analysis. In some embodiment, the multiple match analysis identifies several DIDs corresponding to different tuples. Since the multiple match confidence score is low and/or the risk score is high, in some embodiments, the server may select any of the DIDs as a DID for the device from which data was received; in other embodiments, the server may not provide any DID at all.

In general, the server calculates the DID value for the first time when a device first registers with the server. In various embodiment the server obtains the DID value at a number of subsequent events, when the device is detected as a returning device. As the DID value should not change for a returning device, the determination of the same value at the subsequent event(s) may be associated with a high confidence and/or low risk score. The server may provide a low confidence and/or high risk score for a new DID value or when more than one DID values may correspond to the values of attributes in the received device data. In general, the calculation of a risk score is the converse of the calculation of the confidence score. The threshold may be provided at any value between the designated HIGH and designated LOW values for executing the step-up or other triggered procedure. Such as threshold may indicate that the risk is too high and/or the confidence in the DID determination is too low. In some embodiments, the confidence and/or risk scores are real numbers, or discrete values, e.g. LOW, MEDIUM, HIGH. The threshold to execute the step-up or other triggered procedure if the risk is too high and/or the confidence is too low can be specified as a pre-identified range, e.g., {MEDIUM, HIGH}, The ranges of risk/confidence values can be [0.0,1.0], [−1.0,1.0], [0,1000], [−1000,1000], [−100, 100], etc.

Figure 6:
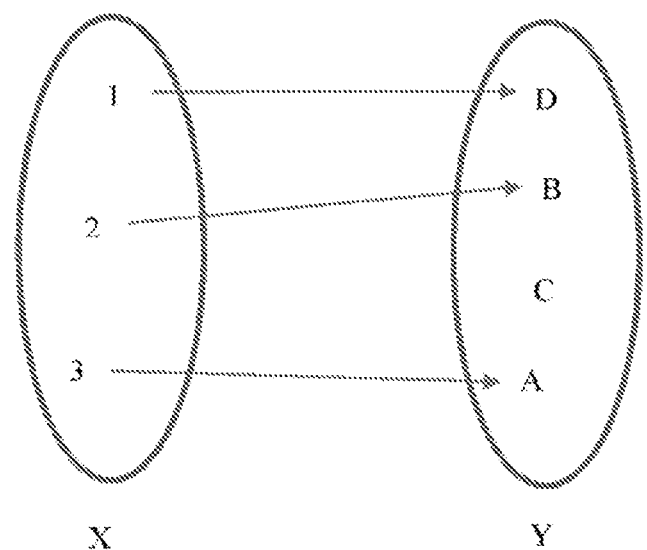
FIGS. 6-8 depict example injective, surjective, and bijective functions, respectively.
Figure 7:
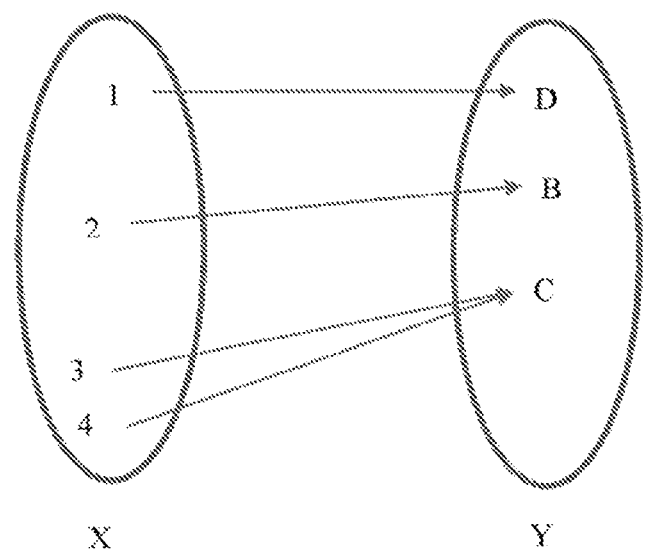

With reference to FIG. 6 an injective function is a function that preserves distinctness: it never maps distinct elements of its domain to the same element of its codomain. In other words, every element of the function's codomain is the image of at most one element of its domain. With reference to FIG. 7, a function $f$ from a set X to a set Y is surjective (or onto), or a surjection, if every element y in Y has a corresponding element x in X such that $f(x)=y$. The function $f$ may map more than one element of X to the same element of Y.

Figures 8, 9, 10:
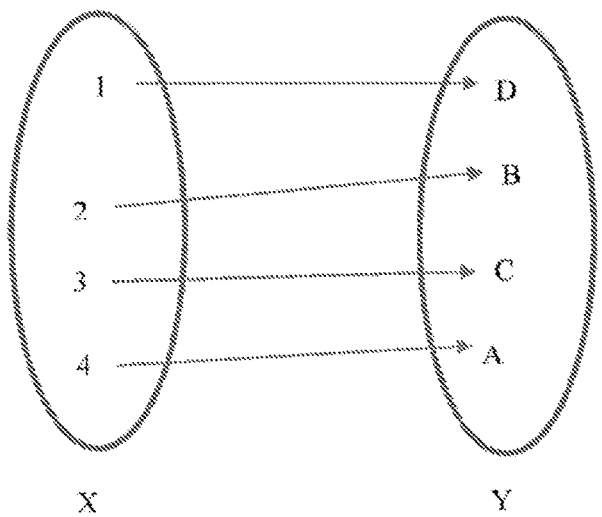
FIG. 9 depicts a database in a state corresponding to the example bijective function shown in FIG. 8, according to some embodiments.
FIG. 10 depicts the database shown in FIG. 9 in a modified state.

With reference to FIG. 8, a bijection, bijective function or one-to-one correspondence is a function between the elements of two sets, where every element of one set is paired with exactly one element of the other set, and every element of the other set is paired with exactly one element of the first set, There are no unpaired elements. In mathematical terms, a bijective function $f: X \rightarrow Y$ is a one-to-one (injective) and onto (surjective) mapping of a set X to a set Y.

In some embodiments, a database is used to implement a function. For example, consider the database table shown in FIG. 9, which implements the bijective function illustrated in FIG. 8. Let, for this example, the function be denoted $f_1$. An alternative representation of both the database table's state and $f_1$ is a set of ordered pairs: {(1,D)(2,B),(3,C)(4, A)}. Suppose a database insert operation were performed that inserts the a new row 5,E into the database. In this case, the database would transition to a new state as shown in FIG. 10. A new function, $f_2$ now represents the updated database state. One definition of $f_2$ is the set:

$$\{(1,D),(2,B),(3,C),(4,A),(5,E)\}$$

As one uses the database, through insert, delete, or modify operations, the database changes state. This means that rows may be added or deleted. Or, the contents of attributes in the rows may change. One may represent a database table as it changes state over time using a sequence of functions. For example, suppose the database undergoes 5 states changes (5 insert, delete, or modify operations). In this case, we may represent the database over time using the sequence: $f_1, f_2, f_3, f_4, f_5$.

A closed-form expression is generally understood to be a mathematical expression that can be evaluated in a finite number of operations. It may contain constants, variables, certain "well-known" operations (e.g., +−×÷), and functions (e.g., nth root, exponent, logarithm, trigonometric functions, and inverse hyperbolic functions), but usually not the "limit" operation. The set of operations and functions admitted in a closed-form expression may vary with author and context.

A function may exist which has no known closed form expression. In practice, if the function represents a database table, and the co-domain of the function is generated using a random number generator or a pseudo-random number generator, then it is highly probable that the closed form expression would not be known. Furthermore, if one were to somehow discover a closed form expression for one of the functions in the sequence, then there would be no guarantee that the same closed form expression would represent other functions in the sequence.

A function may be expressed with multiple parameters as $f(x, y)$. An alternative representation of the same function is a function with a single parameter which is a tuple. For example: $f(<x, y>)$. A tuple is an ordered collection of attributes. Such as function can be represented in a table form, such as the table in FIG. 11. This database table may be represented as a function of tuples:

{(<1,101>,D),(<2,102>,B),(<3,103>,C),(<4,104>,A), (<5,105>,E)}

A 2-tuple has two attributes, e.g., <1,101>. A 3-tuple has three attributes, e.g., <1,101,X>. An n-tuple has n attributes.

The table shown in FIG. 12 may be represented by the following function:

{(<1,101>,D),(<1,102>,B),(<3,103>,C)}

The mapping is properly defined as a function because each element in the domain maps to exactly one element in the co-domain. However, the same would not be true if we were to attempt to map each attribute in the domain into the co-Domain. The issue is that the attribute 1 maps to both the co-domain values D and B.

Various embodiments of a device identifier determination system employ a special kind of function called an afunction. An afunction has the property that all of the attribute values in each tuple must be unique. Therefore, one may identify functions that map individual attribute values to the co-domain as well as the tuple. An example of an afunction is:

$f_A$={(<1,101>,D),(<2,102>,B),(<3,03>,C),(<4,104>, A),(<5,105>E)}

In general, attribute comparison between different attributes is not defined. Therefore, the following function is also an afunction.

$f_B$={(<1,101>,D),(<2,1>,B),(<3,103>,C),(<4,104>,A), (<5,105>,E)}

In $f_B$, the value 1 is an attribute in a tuple which maps to co-domain values D and B. However, $f_B$ is an afunction because each of the first attributes map to different co-domain values, and each of the second attributes map to different co-domain values. The observation that the value 1 is both a first attribute and a second attribute is merely coincidental.

Pseudo-random number generators (PNGs) and random number generators (RNGs) generally produce one or more values in a range. For example, PNGs/RNGs may produce a sequence of values between 0.0 and 1.0. One may execute a function over each generated value to change the range. For example, $f(x)=x+7$, is a function which would change the range of values produced by a PNG/RNG in the range [0.0, 1.0] to a range of real numbers between 7.0 and 8.0. Also, a function may change between the type of range. For example, a function that converts to BASE64 changes the range to letters, numbers, and other characters.

A random value is produced by a random number generator or pseudo-random number generator even if a number of functions that change the original range of the PNG/RNG are executed over the randomly or pseudo-randomly generated value(s). One or more of these functions can be other random number generators or pseudo-random number generators.

Let $f_i(\bullet)$ be an afunction that operates over a collection of parameters called attributes. Let n be the number of attributes, where the attributes are labeled as follows: $\bar{a}=a^1 \ldots a^n$. At any point in the execution of the device identification process, a snapshot is the state at a particular point in time. The $i^{th}$ snapshot may be characterized by the function, $f_i(\bullet)$, where there is no guarantee that $f_i(\bullet)=f_j(\bullet)$ when $i \neq j$. In some cases, $f_i(\bullet)=f_j(\bullet)$ when $i \neq j$, while in other cases $f_i(\bullet) \neq f_j(\bullet)$ when $i \neq j$. A closed form expression for any $f(\bullet)$ is generally not known. In general, each snapshot has its unique function.

An open form expression of each function includes a collection of ordered pairs. The first parameter in each ordered pair represents the domain of the function and may be expressed as a set, group, or tuple of one or more attributes. The second parameter in each ordered pair represents the co-domain of the function, and it is represented by a unique value: Thus, a function $f_i(\bullet)$ can be expressed as:

$$f_i(\bar{a}) \stackrel{def}{=} \begin{cases} d_1 & \text{if } \bar{a} = \bar{a_1} \\ \ldots \\ d_i & \text{if } \bar{a} = \bar{a_i} \end{cases}$$

For example, suppose n=3, i.e., the number of attributes in a tuple is three. An example definition of a function, $f_i(\bullet)$, is:

(T1:<2,yewq,5>,2345)

(T2:<17,p,238>,3434)

(T3:<88,qe,2354>,38)

(T4:<23423,abcd,4>,23)

(T5:<23,xyz,53>,76)

In this example, the function is defined by five ordered pairs, i.e. I=5. The domain of the function is the five tuples: <2,yewq,5>, <17,p,238>, <88,qe,2354>, <23423,abcd,4>, and <23,34,53>. The function is not defined for any tuple which is not explicitly listed. When provided with the value <2,yewq,5>, the function yields the value 2345; when provided with the value <17,p,238>, the function yields 3434.

Let $u_{i,k}(\bullet)$ be a uniqueness function which operates over the $k^{th}$ attribute in the domain of $f_i(\bullet)$. In some embodiments, the function $u_{i,k}(\bullet)$ yields the value 0 if all the values are unique, and 1 otherwise. Other binary values, such as TRUE or 1 when all values are unique and FALSE or 0 otherwise, are contemplated. Given the example definition of $f_i(\bullet)$ above which is defined over 5 ordered pairs, $u_{i,1}$, $u_{i,2}$, $u_{i,3}$ all yield the value 0. The function $u_{i,1}$ yields the value 0 because each of the following values of the first attribute: 2, 17, 88, 23423, and 23 are unique. The function $u_{i,2}$ yields the value 0 because each of the following values of the second attribute: yewq, p, qe, abcd, and xyz, are also unique. The function $u_{i,3}$ yields the value 0 because each of the following values of the third attribute: 5, 238, 2354, 4, and 53, are unique, as well.

Consider another function $f_j(\bullet)$ which is identical to $f_i(\bullet)$ with one exception. It adds a sixth ordered pair: (<2,zzz, 100>,99). In this case, $u_{j,1}$ yields the value 1 because the following values are not unique: 2, 17, 88, 23423, 23, and 2. Specifically, the value "2" of the first attribute 1 appears twice.

In various embodiments:
1. Every snapshot defines a function $f_j(\bullet)$, where there is no guarantee that $f(\bullet)=f_j(\bullet)$, as described above. The closed form expression of $f_j(\bullet)$ is generally not known and may not exist. If such a closed form expression were known, there is no guarantee that the closed form expression for $f_i(\bullet)$, and $f_j(\bullet)$ would be the same. In general, determining the closed form expression for a particular $f_i(\bullet)$ is likely intractable.
2. At each snapshot, $\forall_{i,1 \leq k \leq n} \, i_{i,k}(\bullet)=0$.

As such, in various embodiments, each function in a sequence of functions corresponding to different snapshots satisfies the following properties.

Property 1: A tuple of observations or values is entered into a database if certain conditions identified below are satisfied. Each time a tuple of observed values is added to the database, a new ordered pair is created where the domain is the observed attribute values from the tuple and the co-domain is a pseudo-randomly generated value.

Property 2:
When a tuple of observed attribute values is received as input, a uniqueness test is performed in some embodiments. If there are two or more observed attributes in the received tuple that match corresponding attribute values in two or more different tuples in the database, the database is not updated. Instead, in some embodiments, a risk indication is raised. Using the example above, suppose the observation is <2,p,101>. The value of the first attribute "2" matches with the corresponding value in the tuple T1 and value of the second attribute "p" matches with the corresponding value in the tuple T2. In some embodiments, the observation <2,p, 101> would therefore raise a risk exception because there is a match against two different ordered pairs or tuples.

In various embodiments, if the uniqueness test passes for all attributes in a received tuple, that tuple is accepted for insertion into the database. The uniqueness test can be satisfied in one of two ways. One or more attribute values of the received tuple may match with the corresponding attribute values of a single tuple in the database. Alternatively, no attribute value in the observation (the received tuple) matches with the attribute values of any tuple in the database, In some cases, if the first condition is true, i.e., one or more attribute values in a received tuple match with the corresponding attribute values of a single tuple in the database, it is possible that one or more other attribute values in the received do not match with the corresponding attribute values from the matching tuple. In that case, in some embodiments all of the attribute values of the matching tuple are updated according to the observation. The pseudo-randomly generated co-domain value is preserved, however. The preserved co-domain value can be used to identify/recognize the device from which the observation was received. In the example above, if an observation <2,QQQ,55> were received, the ordered pair in the database associated with tuple T2, i.e., (<2,yewq,5>, 2345) with (<2,QQQ,55>, 2345).

If no attribute value in the received tuple (the observation) matches with the attribute values of any tuple in the database, a new co-domain value is pseudo-randomly generated. A new ordered pair, that includes the received tuple and the new co-domain value, is generated and added to the database. The device from which this observation was received may be recognized as a new device and may be identified using the new co-domain value. In some embodiments, a check is performed on each of the values generated by the pseudo-random number generator to ensure that all of the co-domain values are unique. In some embodiments, the pseudo-random number generator is configured to generate numbers in a large space, e.g., 128, 256, 512 bits, etc., so that the probability of that two pseudo-randomly generated co-domain values would not be unique is insignificant, e.g., less than 1%, 0.5%, 0.001%, etc. The probability that two 64-bit randomly generated numbers are identical is approximately 1 in 10,000,000, 000,000,000,000 (approximately 1 in 10 quintillion), The probability that two 128-bit randomly generated numbers are identical is even less; approximately 1 in 100,000,000,000,000,000,000,000,000,000,000,000, 000,000.

A device identifier (DID) determined as described above is generally a unique identifier of a device that may: (i) survive and attack that may change the device data, (ii) be retained after the device is wiped, (iii) be retained after operating system upgrades. Two types of attacks, spoof attacks and anonymity attacks, may be carried out to gain unauthorized access to service and/or content. Various embodiments described herein can detect spoof attacks when an adversary breaks all attributes and an anonymity attack even when the adversary breaks no more than a single attribute of the device data.

In various embodiments, the techniques described herein can serve the high-security needs of financial services; however, practically any mobile application with a need for security may leverage the solution provided by one or more embodiments. The underlying architecture of the machine e-biometric, in various embodiments, is an infrastructure for financial grade cryptographic services. This infrastructure focuses on secure cryptographic key storage, and implementation of a trusted path built using the cryptographic infrastructure. The client mobile application (client app) compiles and links with the a data-collection module (e.g., a Software Development Kit (SDK)). The trusted path according to some embodiments can securely connect the data-collection module operating within the context of the client application, a remotely located server such as a service provider's, the server residing in a data center, etc.

The trusted path according to some embodiments can protect against unauthorized information disclosure, modification, or replays. These services effectively protect against Man-in-the-Middle, Man-in-the-Application, and other attacks. Using the trusted path according to some embodiments, the data-collection module may provide to the customer and/or another server the information to support a wide variety of information services such as:
Authentication e-biometric
Detection of root or malware infection
Device location
Certificate pinning
Signature based transactions Device interrogation; and identification of device risk indicators The trusted path according to some embodiments can offer equally secure communication in both directions, Using the channel from the server to the device, the server may deliver information. For example:

Passwords and One-time-passwords

Information about device characteristics and/or device attributes

Patterns to search when detecting root or malware infections

Notifications and messages

By establishing a highly secure trusted path between the data-collection module and the server, the applications can enjoy the benefits of a secure channel connecting an application to its devices.

Transport Vs. Message:

A Client system such as APPLE Push Network (APN) notification leverages transport-level security, while in various embodiments, a trusted path uses message-level security. Transport and message-layer security each have their respective pros and cons, as highlighted below.

Anti-replay: Transport-layer security generally does not support the concept of message-level anti-replay. If a provider wishes to send an APN notification to an App on a device, then it is the provider's responsibility to ensure that the App does not suffer from replay attacks. Typically, the provider either ignores this problem, or implements a simple message-layer protocol. In contrast, in some embodiments, a trusted path implements anti-replay in the infrastructure. When using trusted path according to some embodiments, the provider never needs to be concerned with replay attacks.

Non-repudiation: Transport-layer security does not support the concept of non-repudiation. European banks, in particular, like to use non-repudiation. However, the concept is beginning to catch-on globally within financial services. Signature based authentication facilitated via a trusted path can support non-repudiation.

Encryption gaps: Client APN implements a star architecture where providers communicate with the Client APN service over a link protected with transport-level security; and Client APN communicates with the devices using transport-level security. The APN service itself is a point where messages are decrypted and re-encrypted leaving a gap of cleartext. In contrast, a trusted path in various embodiments has no cleartext gap. Financial regulators such as the Hong Kong Regulatory Authority explicitly require end-to-end security for inbound authentication credentials.

Universal channel: Client APN does not support a network-independent notification channel. The provider must use one infrastructure to send notifications to iOS devices, and a second infrastructure for Android. Using a trusted path according to some embodiments, the provider may use a unified service and a channel that can support various platforms.

Size limitations: Client APN implements a store-and-forward messaging service on top of the transport connection. This store-and-forward messaging service typically has a size limitation of 2K per message. In contrast, in some embodiments, a trusted path generally has no message size limit. The Trusted Path's size freedom effectively implies that various embodiments can support machine-machine notifications as well as machine-to-human notifications. For example, a server may distribute non-size-constrained, typically large (e.g. several megabytes), malware signature files through its notification service.

Transport Layer Security (TLS) failures: In recent years, security researchers uncovered holes in Secure Socket Layer (SSL)/TLS. When the holes were uncovered, the financial industry reacted with emergency patches which turned out to be expensive. In some embodiments, a trusted path does not depend upon SSL/TLS security.

Certificate independence: Client APN implements a single certificate on the device. Using bundles and tokens as identifiers, a message-level protocol routes messages to applications. In contrast, a server according to some embodiments uses per-application certificates. If one certificate were compromised, then there would generally be no impact upon the other certificates used by other applications.

Privacy: An APN provider may potentially attempt to send a message to an application residing on the device which has been disabled or possibly removed. The Client APN infrastructure has a copy of this message in the clear text form which cannot be delivered. In contrast, if a user removes an App on the device, or temporarily disables the App by wiping the App's cryptographic keys, then it is cryptographically impossible to decrypt an outbound message transmitted using systems according to some embodiments. European financial regulators are especially concerned with a user's ability to disassociate him or herself from a bank.

Software dependency: if Client APN wishes to add anti-replay, non-repudiation, and high-grade privacy into its infrastructure, then APN would need to implement message-level security services on top of APN which would be similar to those services that the trusted path according to some embodiments provides.

Channel universality: Client APN establishes an infrastructure for outbound communication. The providers need a different infrastructure for inbound communications. In contrast, in some embodiments, a trusted path unifies a single infrastructure and key management facility over inbound and outbound communication, which operates across both iOS and Android.

Figure 13:
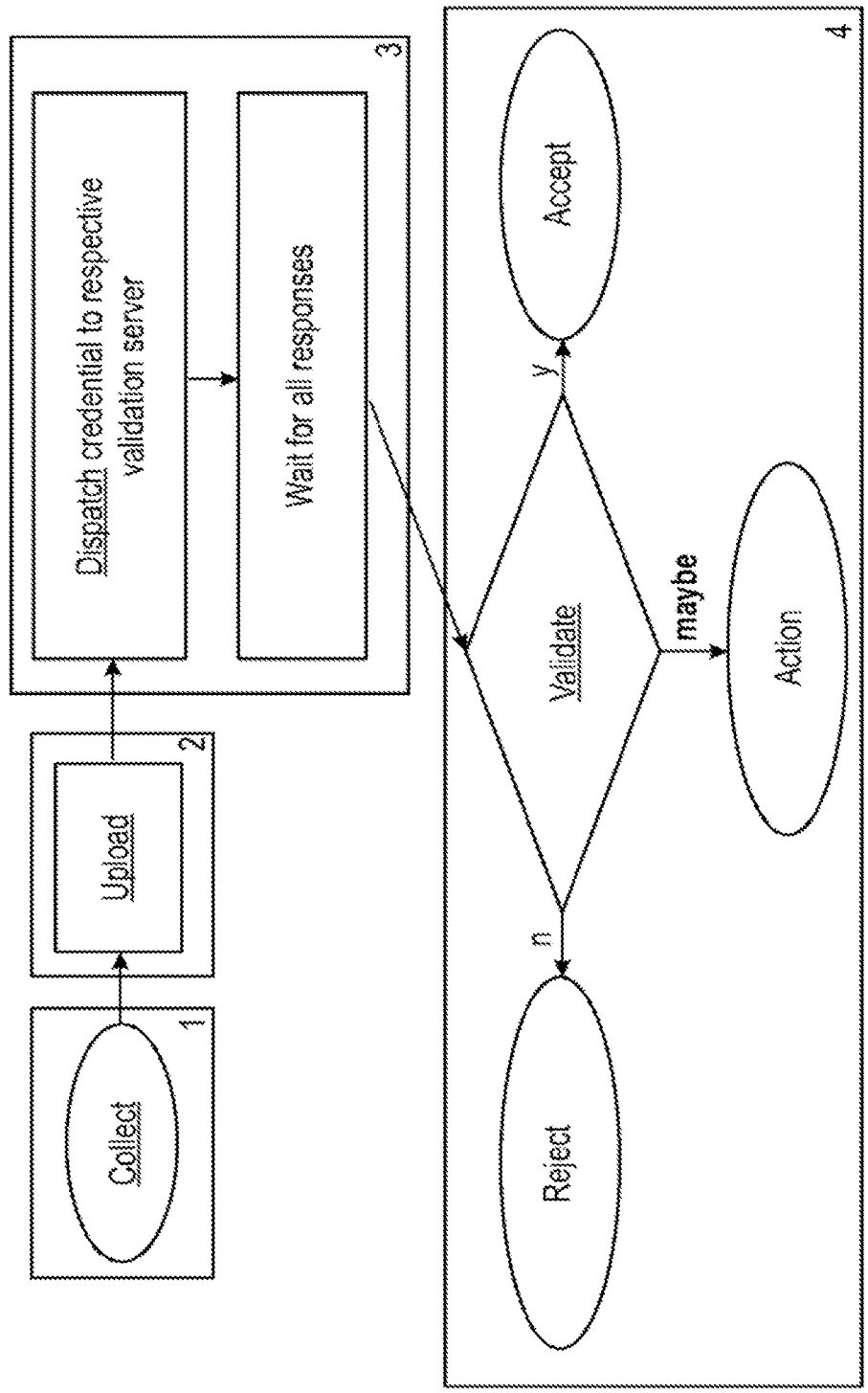
FIG. 13 illustrates a reference authentication flow depicting a bank's credential validation service, according to one embodiment.

FIG. 13 illustrates a reference authentication flow depicting a service provider's, e.g. a bank's credential validation service, according to some embodiments. The steps of the flow include:

1. On the user's device, the bank collects authentication credentials.

2. The user's device uploads the authentication credentials to the bank.

3. Upon reception of the authentication credentials, the bank routes the credentials to a dispatcher and waits for a response. The dispatcher sends each individual credential to its respective validation service.

4. Upon receipt of the responses from the validation services, the bank performs a risk analysis. In some embodiments a simple analysis producing a Boolean result is produced. In some embodiments a risk-based action depicted on the flow chart as "maybe" is offered. Example actions include requesting an additional authentication credential, or limiting access to only a small collection of banking services, etc.

Figure 14:
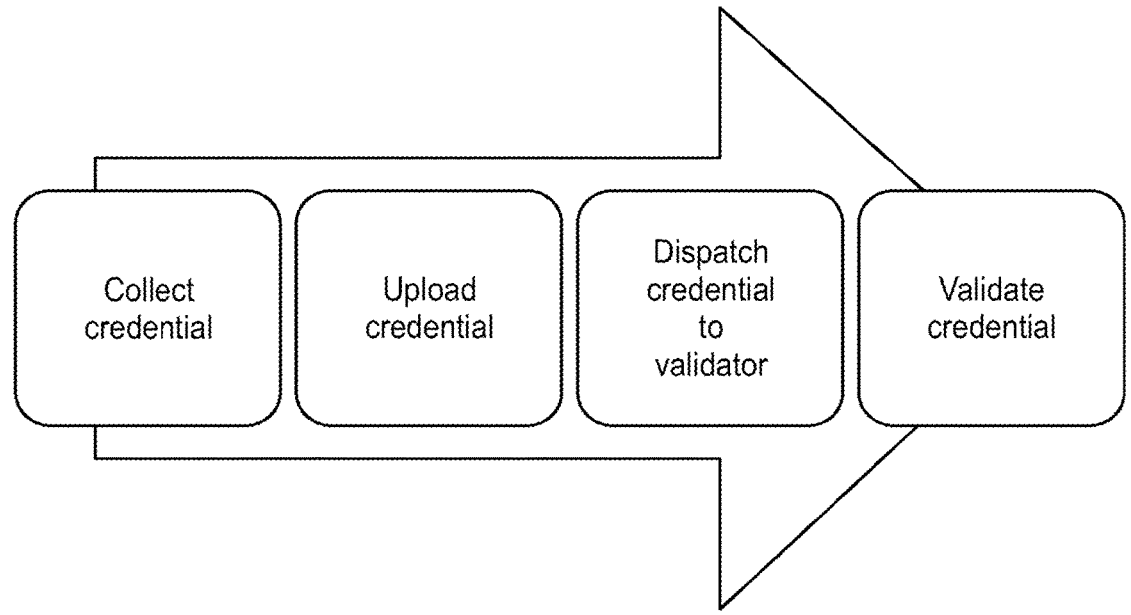
FIG. 14 illustrates the reference flow of FIG. 13 from the perspective of a process.

FIG. 14 illustrates the reference flow from the perspective of a process. The architecture of some systems described herein conforms to this process.

Figure 15:
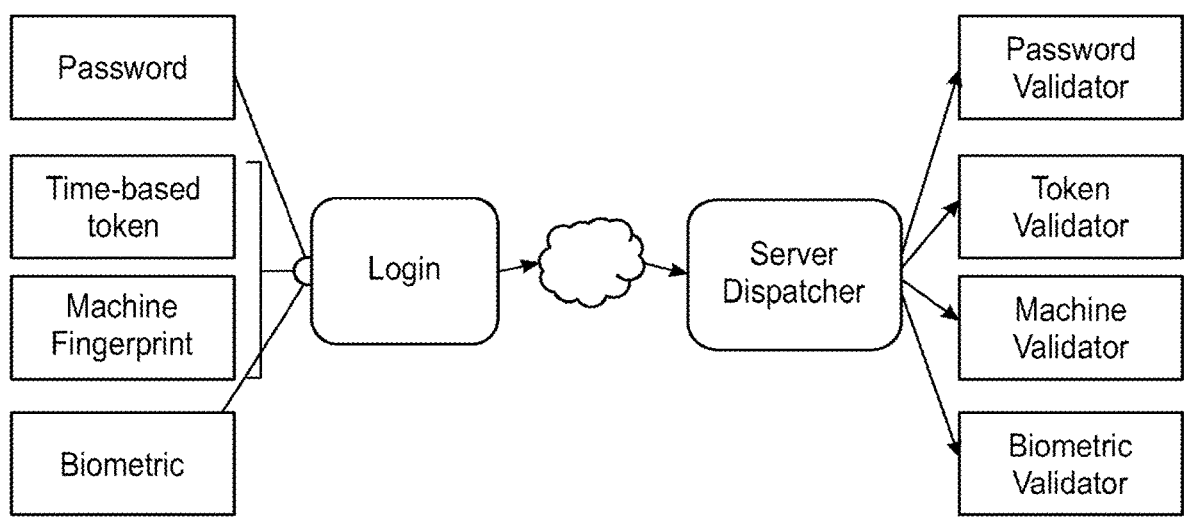
FIG. 15 illustrates an example user authentication based on the reference process illustrated in FIG. 13.

FIG. 15 illustrates an example bank which implements the reference process shown in FIG. 2. For illustrative purposes, assume that the example bank authenticates using multiple different types of credentials. The example bank proves that the user has "something-you-know" by requiring a password; the bank authenticates two separate credentials for "something-you-have" through both a time-based token such as RSA SecurID or Vasco token and additionally validates the machine fingerprint; and the bank validates "something-you-are" through a biometric. Regardless of the type of credential, the bank conforms to the reference process for collecting, uploading, dispatching, and validating the credential.

First the bank collects the credential through processes executed on the user's device:

Password: prompt the user to fill out a form field.
Token: prompt the user to fill out a form field by copying the current value presented on the token.
Machine identifier: automatically interrogate the device to extract the fingerprint
Biometric: Ask the user to make a sound, present a thumbprint, or perform the other action necessary for the biometric.

Second, the user's device uploads all of the credentials through the network to the bank's servers. Third, the bank's authentication server operates as a dispatcher which routes each credential to its validation server and waits for a response. Fourth, the bank's individual authentication processes validate. The password service forms a message digest of the submitted password and compares against the message digest in the database; the token validator uses the current time and the token value submitted by the user for comparison with a vendor generated reference value; the machine fingerprint validates against a fingerprint authentication server; and the biometric checks against the biometric server.

The results pass back to the dispatcher which consolidates the individual validations and produces a response. Some banks implement a binary pass/fail response to the login. These banks only allow the login request to be processed if all credentials validate. In some embodiments, a bank (a service provider, in general) can offer a "maybe" response which precipitates a risk-directed action. For example, the bank may permit the requested login but disable some risky services. The machine fingerprint is one of possibly multiple authentication credentials.

Figure 16:
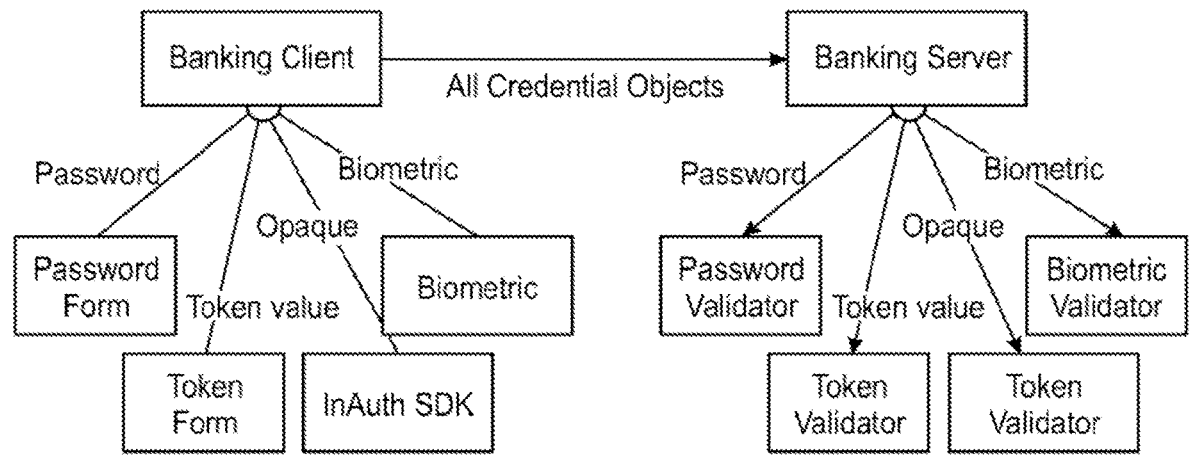
FIG. 16 expands detail of the example by introducing an object flow, according to some embodiments.

FIG. 16 expands detail of the example by introducing the object flow. Each authentication credential has a unique object that passes through the system. The objects in the example are Password, Token value, a secured object (e.g., InAuth's Opaque Object), and Biometric, produced by the password form field, token form field, an interrogator of a data-collection module, and Biometric collector, respectively. Next, the banking client uploads all of these credential objects to the banking server for further validation.

Embodiments of the secured object and the embodiments of the data-collection module are discussed in detail below. In addition to validating the machine fingerprint, in some embodiments the validation server may also provide one or more of the following services:

Anti-root check: Provide a risk-based authentication credential which explains whether the mobile device may have been rooted.
Anti-malware status: Provide a risk-based authentication credential which shows whether dangerous malware may exist on the device.
Location-check: Provide a risk-based authentication credential which can validate a user's location data.

Figure 17:
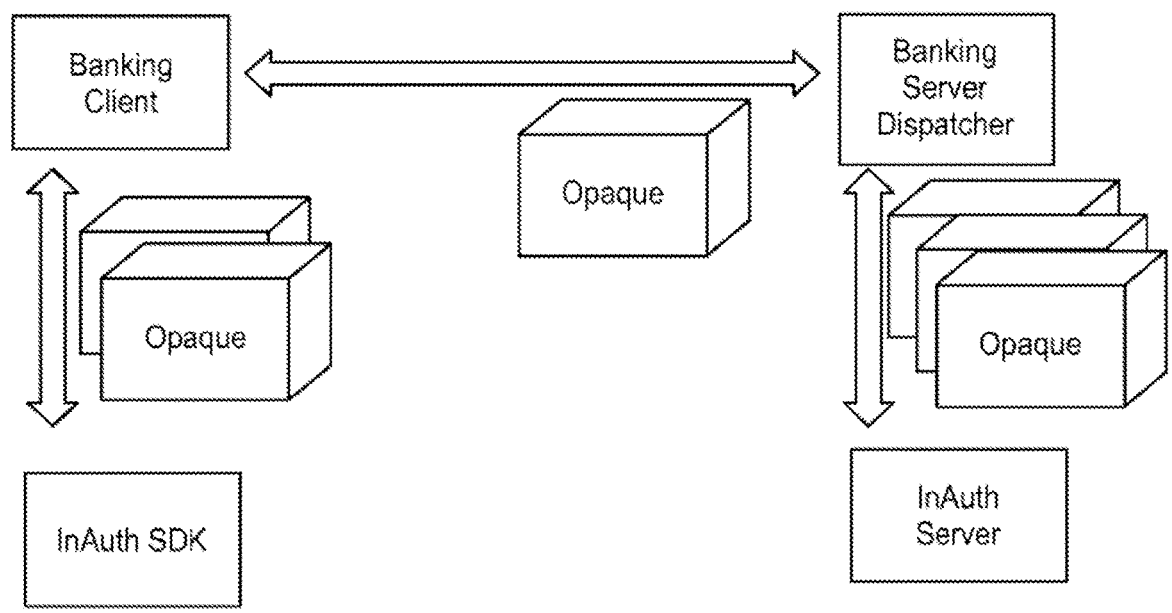
FIG. 17 illustrates a data-collection module and a client app communicating using secured objects, according to some embodiments.

In some embodiments, the data-collection module and the client app (e.g., the Banking Client) installed on a user device may communicate through secured objects as illustrated in FIG. 17. A user device may include a phone, a smart phone, a tablet computer, a laptop, a desk top, a mobile computing device, a custom point-of-sale device, a device in the Internet of things, etc. The secured objects are self-contained units of information designed to provide protection against data leakage, unauthorized tamper, and/or replay. This means that some embodiments of the secured objects can resist man-in-application and man-in-middle attacks.

In some embodiments, the data-collection module acts in a capacity of a library which either produces secured objects as returns to method invocations from the Banking Client; or accepts secured objects submitted from the Banking Client. In the second case, the secured object would have been manufactured by the a server such as a bank server, an authentication server, etc., and passed in the reverse direction through the Banking Server Dispatcher to the Banking Client, and then to the data-collection module. Although the Server Dispatcher and the Banking client have physical access to the secured objects that they forward, the internal security of the secured object prevents any attack launched from these or any other intermediaries.

As described above, some service providers employ simple means of authentication such as passwords and hardware tokens. However, some of the modern forms of authentication may be more complex because they employ calibration. Biometrics and malware detection are two example types of authentication which may need calibration. In some embodiments, the calibration step provides a reverse flow from the server to the collector (the data-collection module) which impacts the means by which the collector operates. For example, in a facial recognition biometric system, the server may provide indication that the user may have accidentally placed his or her finger over the lens. The collector responds with a visual indicator to the user to retry. In a malware detection system, the server may produce configuration files which explain to the malware detector implemented as part of a data-collection module on a client device the list of malware signatures for which to scan, in some embodiments, crimeware detection is provided by a data-collection module, providing crimeware detection result(s).

While integrating with an authorization server, the service provider may determine a policy for calibration. The service provider can implement the mechanism through invocations of methods on the authorization server and/or on the data-collection module to produce and consume secured objects that carry malware signatures, respectively. For example, in some embodiments, suppose a bank's policy is to ensure that the malware signature is not more than one-week old. When the user opens the banking application, the application executes a method on the data-collection module to determine the age of the current malware signature. The data-collection module looks into its encrypted and protected files within the application sandbox for a non-volatile cache of the malware signature file, and then returns a result. If the malware signature file does not exist or is more than a week old, then the Banking Client sends a request to the Banking Server. The Banking Server queries the authentication server for a secured object containing the latest signature file. The Banking Server then returns this secured object to the Banking Client; and the Banking Client submits this secured object to the data-collection module through a method invocation. In general, a sandbox of a client app is a portion of the file system of the user device which is accessible only by the corresponding app. In general, no other app may view or access another app's sandbox without breaking security.

As a performance optimization, the authentication server may load its most current secured object containing the signature file on an externally-accessible web server. External users may download the secured object whenever they wish without requiring a method call into the Server. However, these external users may not open or modify the secured object due to the Secured Object's internal cryptographic protection mechanisms described below. Nevertheless, the external user may load the secured object into the data-collection module prior to the point that the user manually opens the banking application.

Figure 18:
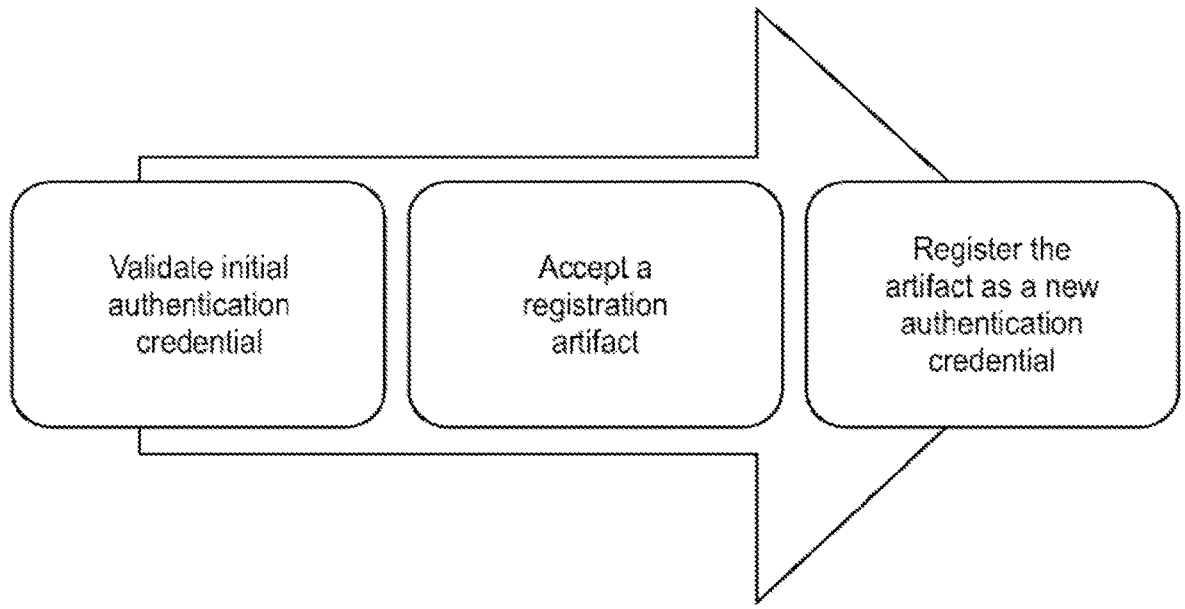
FIG. 18 illustrates credential registration, according to some embodiments.

The reference credential validation process depicted in FIG. 14 is one of two types of processes implemented by the bank. The second type of process is registration. Many users are familiar with new password or forgotten password flows. Typically, the bank prompts the user for some type of an initial authentication credential, e.g., challenge questions, externally-obtained password or QR code, confirmation of offline response through e-mail or text message, Social Security number, or amount displayed on last banking statement. Upon a successful response to the initial authentication credential, the bank executes the credential registration as illustrated in FIG. 18.

Credential registration, according to some embodiments, conforms to the reference credential registration process. A client app installed on a user device (e.g., a Banking Client) submits a request to the data-collection module requesting a secured object containing a registration message. The client app uploads the secured object to the Banking Server: and the Banking Server submits the secured object into the server which completes the registration.

Mobile Client Software Layers

Figure 19:
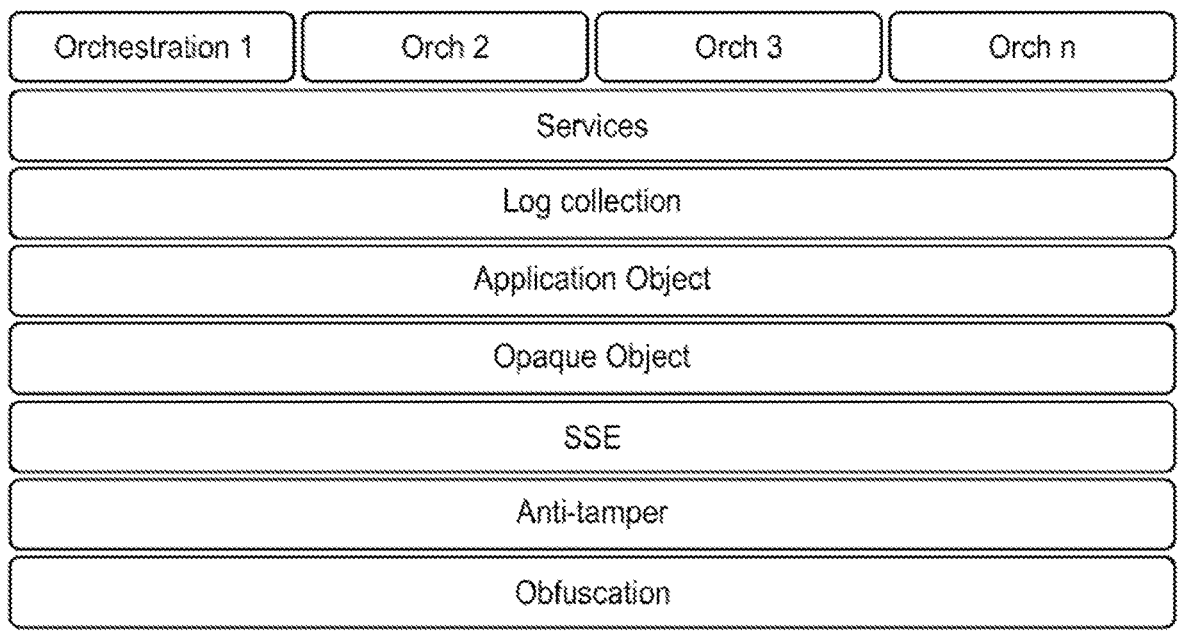
FIG. 19 illustrates the software layers implemented on a mobile user device, according to some embodiments.

FIG. 19 illustrates the software layers implemented on the mobile client.

Obfuscation: Obfuscation is a technology which operates over software. An adversary cannot easily ascertain the programming logic of obfuscated code. The scope of the obfuscation layer usually covers executable software such as the client app installed on a user device (e.g. a smart phone, tablet, computer, etc.) and/or the data-collection module and one or more components thereof. The obfuscation layer may not obscure data.

Anti-Tamper: The anti-tamper solution protects against an adversary who modifies the banking application or the data-collection module. The scope of the anti-tamper layer also typically covers executable software. The anti-tamper layer may not protect against data tampering. This layer generally prevents changing and/or replacement of authorized executable code. Alternatively or in addition, some embodiments provide for detection of any tampering with the client app and/or data-collection module and/or can provide validation that the executable software was not tampered with, as discussed below.

Security Module: In some embodiments, a security module (e.g., InAuth Soft Security Element) is associated with a data-collection module. The security module may provide cryptography and/or non-volatile key storage services.

Cryptographic Keys

Figure 20:
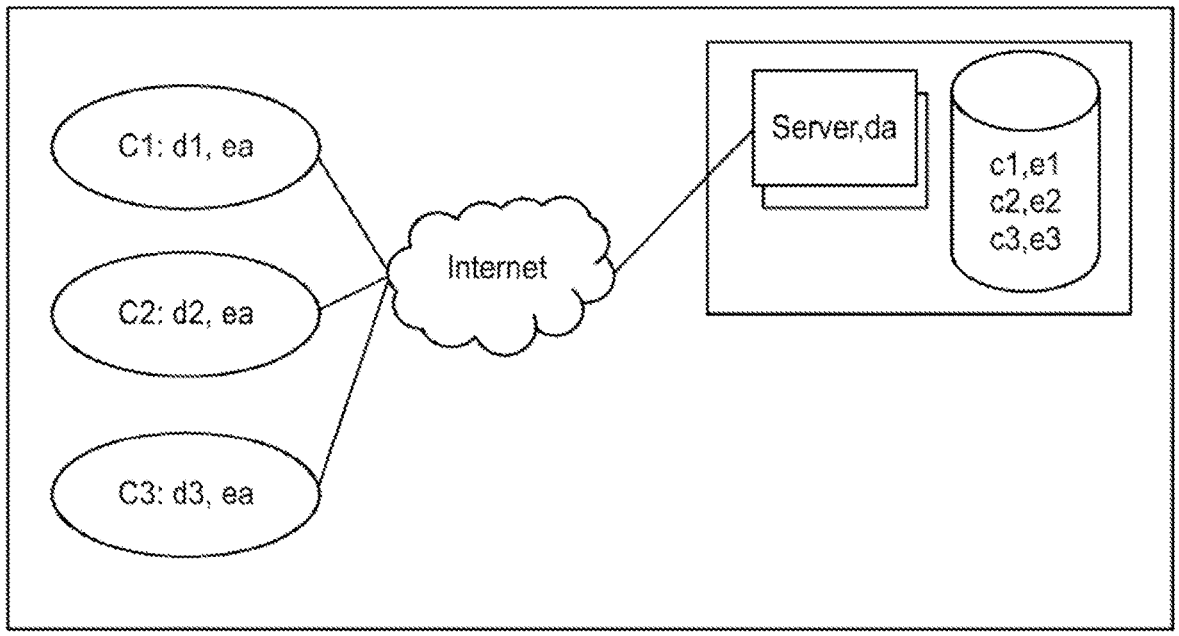
FIG. 20 illustrates establishment of cryptographic keys between a client app/data-collection module/security module and a service provider's server and/or an authentication server, according to some embodiments.

FIG. 20 illustrates the use of cryptographic keys according to some embodiments. The left of the diagram illustrates three mobile devices labeled C1, C2, and C3, respectively. Within the sandbox of the banking application of each device is a private key of an asymmetric key pair. For example, within C1's sandbox is its private key d1; C2 holds its private key d2; and C3 has its private key d3, Additionally, each device's sandbox also holds the public key of the banking server. The diagram also shows that all of the devices hold exactly the same public key because in FIG. 20, the clients depicted are the clients of the same service provider (i.e., the bank, in this example).

Figure 21:
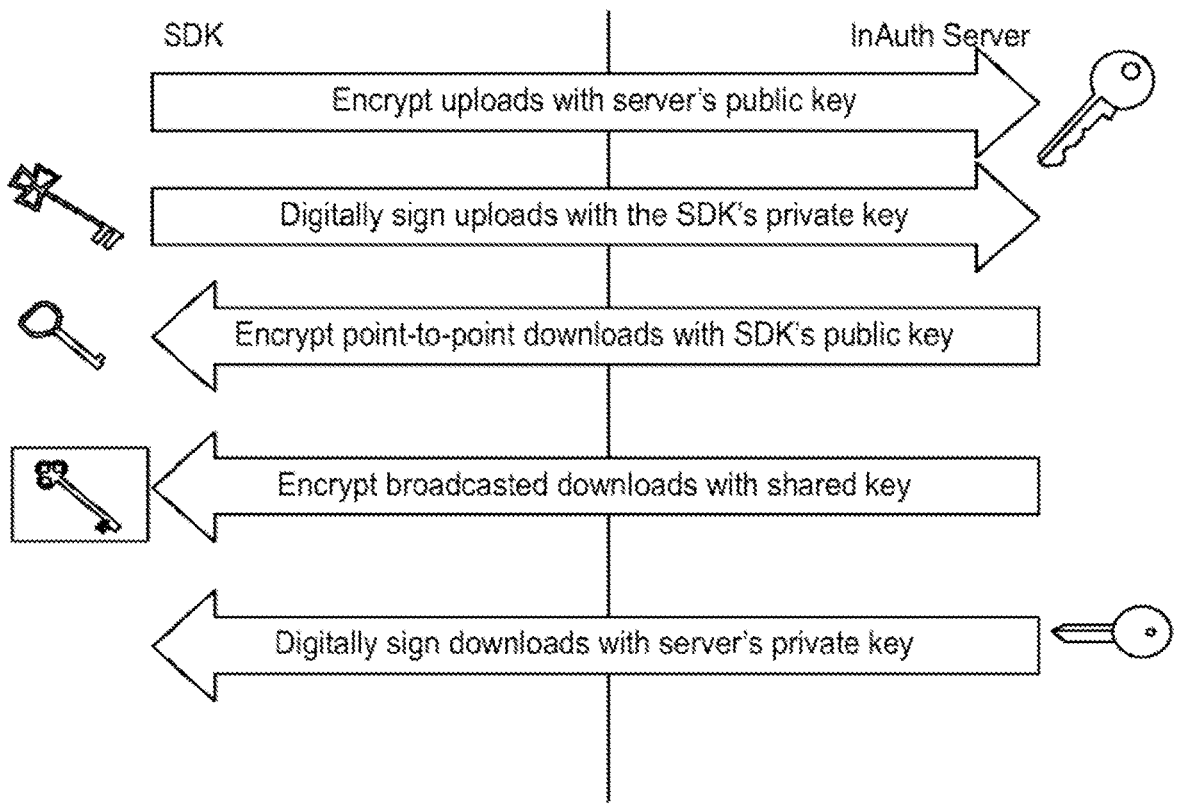
FIG. 21 illustrates the use of cryptographic keys, according to some embodiments.

The right of the diagram depicts the banking server. The banking server maintains a database (directory) which holds the public key associated with each client. For example, if a fourth client were to onboard, then the result of the registration sequence would be an installation the fourth public key into the banking server's database (directory). FIG. 21 depicts the user of private and public keys for encrypting information and for digitally signing information by the client app/data-collection module/security module and by the servers, according to various embodiments.

While the architecture may assume that the environment adequately protects the servers, one may not impose a similar assumption upon the clients. Rather, the clients reside outside of the bank's security perimeter and may be subject to attacks, abuse, and malware. In defense, in some embodiments, the security module protects the keys stored on each client as described below. The objectives of a security module may include one or more of, The private key, di, must not leak out of the security module. Even if the adversary were to bypass device security by rooting the device, the adversary would encounter considerable difficulty when working to discover a private key.

An adversary should not gain the ability to tamper with the contents of a sandbox of a client app with the objective of modifying or substituting the private key.

An adversary should not gain the ability to tamper with the contents of a sandbox with the objective of modifying or substituting the server's public key.

The security module can store cryptographic keys in either volatile or non-volatile storage. The location of the non-volatile storage is typically the application's, i.e., a client app's sandbox. Although a service provider's application has access to the sandbox, the security module's secure storage provides a means to protect against man-in-application attacks. Secure storage leverages keys which are not available to the application; and the Secure Storage layer may enjoy the benefit of protection through the underlying obfuscation and/or anti-tamper layers.

The following list presents the services offered by the security module, according to some embodiments:
Asymmetric key pair generation
Asymmetric cryptographic encryption/decryption
Digital signature/validation
Symmetric key generation
Symmetric key wrapping/unwrapping
Symmetric encryption/decryption
Secure non-volatile storage/retrieval in the application's sandbox
Serialization/deserialization of asymmetric key into secure non-volatile storage container.

In some embodiments, the programming languages used to implement the security module are C and C++, The underlying obfuscation and anti-tamper layers can be effective when protecting software constructed using low level languages. Various other programming languages may also be used to implement the client app, the data-collection module associated therewith, and/or the secure module associated with the data-collection module.

Non-Volatile Storage

In various embodiments, the architecture described herein can provide protection against rooted devices and/or man-in-application-attacks. The nonvolatile storage protection offered by the operating system is often not sufficient. For example, the data-collection module may reside within the context of a rooted device or compromised client application. As such, in some embodiments, the security module implements its own mechanism to protect various keys and/or other information.

In some embodiments, the security module defines three levels of keys:
Data keys
Storage keys
Master keys In other embodiments, one, two, or more than three levels of keys may be used. A key used by any layer above the security module is a data Key. No upper layer can detect the existence of either storage keys or Master Keys. The security module stores each data key in a signed and encrypted file within the application's sandbox. The security module uses storage keys to sign and encrypt the files containing the data keys. No two data keys may reside in the same file.

The security module stores each storage key in a signed and encrypted file within the application's sandbox. The security module uses a master key to sign and encrypt the Storage key. In various embodiments, the master key does not exist in any non-volatile storage. Rather, the security module generates the master key dynamically. However, the dynamic generation method always yields the same results upon every iteration. This means that no hardcoded key exists that may be subject to static code analysis. Rather, the adversary must trace the execution sequence of the security module in order to discover the master key, making the detection thereof difficult.

In some embodiments the security module defines four or more levels of keys as follows:
Data key
Storage 1 keys
Storage 2 keys
. . .
Storage n keys
Master keys The security module may use storage keys 1 to sign and encrypt the files containing the data keys. The security module may use storage keys i+1 to sign and encrypt the files containing the information signed and encrypted by storage key i. The security module may use the master keys to sign and encrypt the information signed and encrypted by storage key n, where n is the largest level of a storage key.

Secured Object

The data-collection module and the authorization server communicate using secured objects transmitted directly between these two entities or indirectly through one or more possibly untrusted intermediaries. Upon reception of a secured object, the receiver can validate that object in accordance to the process depicted in FIG. 22.

First, the recipient receives the secured object. Next, the recipient decrypts to discover the underlying message. Next, the recipient validates the digital signature, and lastly, the recipient validates the anti-replay information. If all the validations succeed, then the recipient accepts the message. Otherwise, the recipient returns an exception to its invoker and discards the message without further processing. The errors do not automatically propagate across the network to the peer, e.g., if the authentication server rejects the message, then the service provider's server that invoked the authentication server's API may receive the error as a return of the method invocation (e.g., as shown in FIG. 17 illustrating an Opaque Object communication path).

Figure 23:
FIG. 23 depicts three logical components of a secured object, according to some embodiments.

In some embodiments, the secured object is a serializable object that protects any information object carrying information to be communicated such as keys, malware lists, application list to be used in detecting whether the device is rooted, location information, etc. The secured object generally relies upon cryptographic controls to ensure that it is an atomic, inseparable object. This means that an adversary typically cannot alter or shuffle the individual components of a secured object. The secured object has three logical components as shown in FIG. 23.

Protected Information Object: In some embodiments, the Protected information object is an application-specific JSON-formatted unit of information that enjoys cryptographic protection. Examples of information Objects are registration, logs, etc., as discussed below.

Anti-Replay: The Anti-Replay component can protect the secured objects from replay attacks. If an adversary were to play back an old secured object, then the peer would detect the playback attack.

Anti-Tamper: In some embodiments, the Anti-Tamper component protects against an adversary who links malware to the client app installed on a user device, a data-collection module associated therewith, and/or a corresponding security module. The Anti-Tamper unit provides a vehicle for securely providing information to a recipient such as a client app, a service provider's server, an authentication server, etc.

Figure 22:
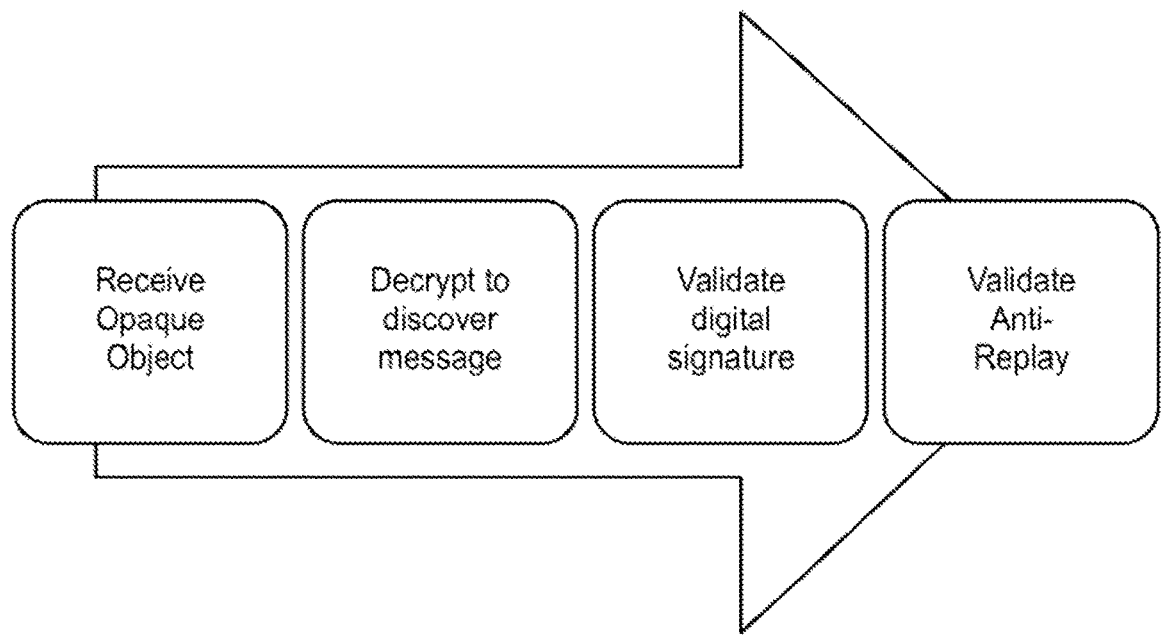
FIG. 22 illustrates receiver validation of a secured object according to some embodiments.
Figure 24:
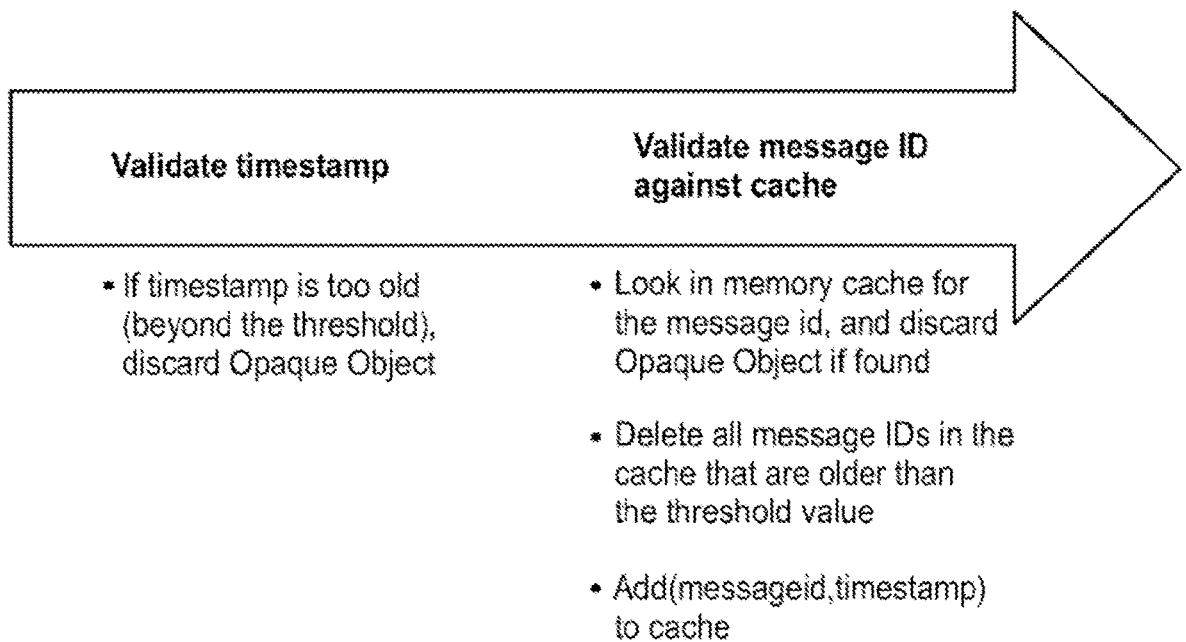
FIG. 24 illustrates anti-replay check according to some embodiments.

In some embodiments, after performing the first three steps of FIG. 22, the recipient concludes with the anti-replay step illustrated in FIG. 24. The mechanism used to check anti-replay can be similar for both the authentication server and the data-collection module. Each maintains a configurable threshold, e.g., 5 minutes. The description below presents the authentication server's process:

Validate timestamp: Each secured object has a timestamp inserted by the peer (e.g., data-collection module sending a secure object). If the timestamp is older than the threshold subtracted from the current time as observed by the authentication server, then the server discards the secured object. For example, if the current time is 10:00 AM, then the server discards any secured object transmitted before 9:55 AM on the same day.

Validate message id against cache: Each secured object includes a random number used as a message ID. The space of random numbers is large enough (e.g., at least 64 bits) to avoid or at least minimize the possibility of collision. The Authentication Server maintains a cache of ordered pairs of (ObjectID, timestamp) for each peer data-collection module. Upon receipt of an secure object; the Authentication Server first validates that the incoming ObjectID does not appear in the cache for the peer data-collection module. If the ObjectID is in the cache, then the incoming secured object is a replay and the Server discards. Otherwise, the Server accepts the secured object and adds its ObjectID and timestamp to the cache. Finally, the Server discards any records from the cache that are older than the time threshold.

Figure 25:
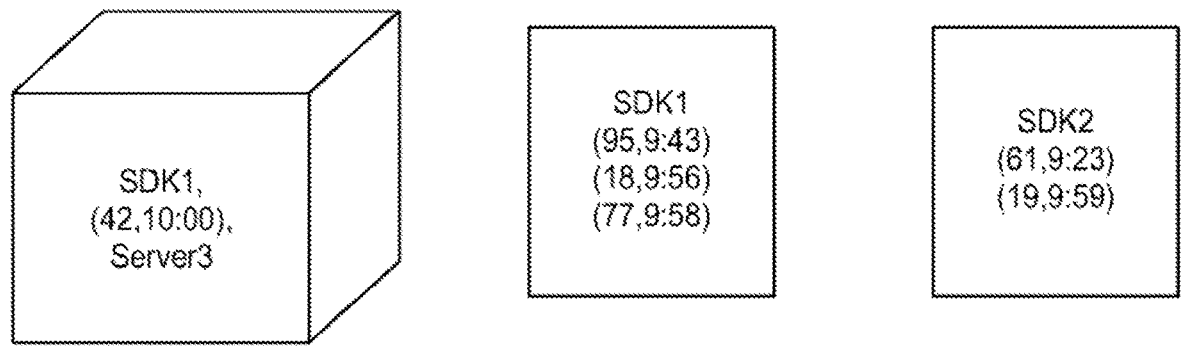
FIG. 25: illustrates an example anti-replay detection.

For example, consider the scenario illustrated in FIG. 25. Server 3 receives the secured object on the left of the diagram from data-collection module 1. Server 3 identifies the table for data-collection module 1 and notes three items in the cache. Server 3 compares the ObjectID of the incoming message (42) against the three ObjectIDs in the cache (95, 18, and 77). Since 42 is not in the cache, Server 3 accepts the incoming secured object and inserts (42,10:00) into the cache. Server 3 may subsequently discard (95,9:43) from the cache because it is older than the threshold of 5 minutes.

The anti-replay mechanism assumes that each distributed Authentication Server instance has its own asymmetric key pair. So, Authentication Server1 cannot receive a message intended for Authentication Server2 because Authentication Server1 would not have the requisite decryption key. This assumption protects against an attack where an adversary records an secured object transmitted and processed by one Authentication server, but then plays back the secured object to a second Authentication server. One need not assume that the distributed Authentication servers share state because they may potentially reside in different data centers.

Format of a Secure Object

In some embodiments, the expression of the secured object is in JSON. The secured object has three parts.

encryptedBody: This field contains the encryption of a body of a message. All characters are UTF-8, in some embodiments. The body of a message is also referred to as the information object.

header: Anti-replay and other cryptographic information used to protect a message (hashed message authentication code)

integrity: Digital signature or HMAC used to ensure message authenticity An example format is as shown:

```
{
    "encryptedBody": "...",
    "header" : {
        "data":
"ewoglCAglmFudGlSZXBsYXkiOiB7CiAglCAglCAglm1lc3NhZ2VJZCl6lCl5MjkyMzMwMzQiLAoglCAglCAglCJ
0aW1lljogljlwMTQtMDctMDNUMDk6MjQ6MzErMDU6MDAiCiAglCB9LAoglCAglmNyeXB0byl6lHsKlCAglC
AglCAlYW50aVRhbXBlci1tZCl6lCl5MDg3MDk3OClsCiAglCAglCAglmFudGlUYW1wZXJNb2Rlijoglkl4LU1zdH
liLAoglCAglCAglCJhc3ltljogilJTQTFfNSlsCiAglCAglCAglmJvZHktbWQlOlAlMDgwNzk4liwKlCAglCAglCAiZW5
jb2RlijoglkJBUOU2NClsCiAglCAglCAglml2ljoglj1zODEzOWE5liwKlCAglCAglCAicGVlckVaY1B1YmtleSl6lFsKl
CAglCAglCAgiCAgljlzNDlzOTlzOTgzNDUwMzk3NTgiCiAglCAglCAgXSwKlCAglCAglCAic2lnbmluZ1B1YmtleSl
6lClwOTgwNzA5MClsCiAglCAglCAglnN5bSl6lCJBRVMyNTYiLAoglCAglCAglCJ3cmFwcGVkU3ltRW5ja2V5ljo
gljl5MjM5MjM0NTUiLAoglCAglCAglCJ3cmFwcGVkU3ltSW50ZWdLZXkiOiAiMjkyMzkyMzQ1NSlKlCAglH0K
fQo=",
        "digest":"239223932"
    },
    "integrity": {
        "messageAuthenticationCode" : "0",
        "signature" : "23089234243",
        "type" : "signature"
    }
}
```

"data" is a BASE64 encoding of a JSON structure as shown below:

```
{
    "antiReplay":{
        "messageId": "0.929233034",
        "time": "2014-07-03T09:24:31+05:00",
        {"messageid-history":["0.234987","0.98234","0.27237"]}
    },
    "crypto": {
        "antiTamper-md": "90870978",
        "antiTamperMode": "lx-Mstr",
        "asym": "RSAES-OAEP",
        "sym": "AES-256-GCM",
        "encode": "BASE64",
        "peerEncPubkey": ["2342392398345039758"],
        "signingPubKeyFingerprint": "09807090",
        "wrappedSymEnckey": ["2923923455"],
        "wrappedSymIntegKey": "0",
        "iv": "238139a9",
        "body-md": "080798",
    }
}
```

AntiReplay

The purpose of antiReplay is to protect against replay attacks. The first level protection is the "time". Upon receipt, the recipient rejects any "time" value in the future. Additionally, the recipient rejects any time value beyond a threshold in the past. For example, suppose the threshold is 20 minutes. The recipient rejects any message with a "time" value more than 20 minutes in the past. The line threshold can be a few seconds, minutes, hours, or days.

The "time" value protects against gross replay attacks, but does not protect against recent replay attacks. The recipient caches all the message IDs received during the period up to the last threshold. The recipient generally ensures that it never accepts the same messageID twice. In some embodiments, the messageID is a BASE64-encoded value that includes a version number, a period, and a 64-bit value. As long as the time threshold for anti-replay is reasonable, the recipient should only need to hold a handful of session IDs. So, a space of $2^{64}$ session IDs is well-beyond sufficient. However, in some embodiments, we limit the space to 64-bits, because the message digest in the signature is 256 bits. If the message ID were longer, then an adversary would have an opportunity to force hash collisions by manipulating the random-appearing 64-bit value until it produced a desired message digest. By limiting to just 64-bits, the probability of a hash collision is approximately 10-39 for a 256-bit message digest. In other words, the adversary does not have enough space in the message ID to force a hash collision. For messages sent from the data-collection module to the server, the version number is always 0 in some embodiments. In some embodiments, the message digest algorithm is SHA-512 producing a 512 bit message digest; and the random or pseudo randomly generated value has 256 bits.

In some embodiments, the recipient only accepts secured objects with the latest version number. Once the recipient receives a secured object with a version number of i, the recipient may never again accept an secured object with a message ID of i–1 or below. The message-id history is a list of zero or more of the most recently received message IDs. The number of IDs on the list is an implementation detail determined by the sender. Typically, when the server is the sender and the data-collection module is a recipient, then the server sends an empty list. When the data-collection module is the sender and the server is the recipient, then the sender places a few of the latest message-ids on the list.

Crypto

In general, Crypto contains one or more of the following items:

The anti-tamper-md is a message digest used for the purpose of providing tamper protection. When the server validates the message digest, the server ensures that some aspects of the client or application have not been tampered. In addition the anti-tamper-md covers any value returned by the security module for tamper protection. In other words, anti-tamper-md=md(software I SSEvalue). A purpose of the anti-tamper-md is to protect against bot attacks. Suppose, for example, a bot were to link with the data-collection module. In this case, the bot would benefit from authentication security as opposed to being prohibited. The anti-tamper-md combats this scenario by providing the fingerprint of the parent application. A fingerprint can be a message digest (e.g., a SHA-256 message digest) computed over the application. The authentication server expects a software fingerprint for one or more of the client app, the data-collection module, and the security module. Should any of these software modules be modified or replaced without authorization, the fingerprint would change. The authentication server, upon noticing a different message digest than that expected, can determine that the sender software is not genuine.

The anti-tamper-mode specifies what information is covered under the anti-tamper-md, One option is to perform the message digest not only on the data-collection module, but additionally the invoking client application. Upon receipt, the server validates against expectations. The purpose of the anti-tamper-md is to protect against bot attacks, Suppose, for example, a bot were to link with the data-collection module. In this case, the bot would benefit from security provided by some embodiments as opposed to being prohibited. The anti-tamper-md combats this scenario by computing and sending the fingerprint of the parent application. In some embodiments, the anti-tamper-mode has the value "0", then the recipient should ignore anti-tamper-md.

Asym provides the asymmetric algorithm used for encryption.

Sym provides the symmetric algorithm used for encryption

Encode is the encoding scheme, e.g., BASE64 used to encode raw bits peerEncPubKey is the list of public keys that each encrypt the symmetric key signingPubKeyFingerprint is the message digest of the public key used by the data-collection module to sign the secured object wrappedSymEnckey is the list of symmetric keys each wrapped in a public key. The number of wrappedSymEnckeys is equal to the number of peerEncPubKeys wrappedSymIntegKey: When not using a digital signature in order to optimize performance use the SymIntegKey. The algorithm is an HMAC. This value should be set to "0" when using signatures, in some embodiments.

IV is the initialization vector used for symmetric encryption of the body

Body-md is the message digest of the body before it is encrypted.

Analysis of Secured Object

Figure 26:
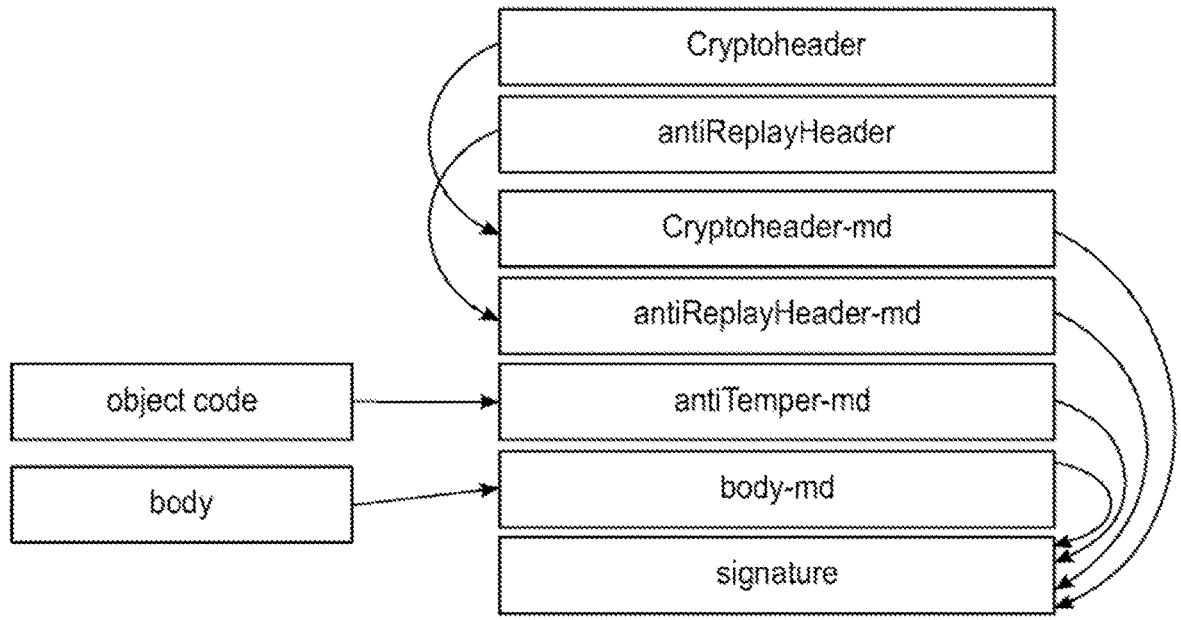
FIG. 26 illustrates a secured object digital signature, according to some embodiments.

Secured Object Integrity: FIG. 26 illustrates a diagram of the secured object digital signature. As illustrated in the diagram, if any aspect of the secured object were changed by an unauthorized party, then the digital signature would not validate. As a result, all headers and bodies enjoy integrity protection provided that the adversary does not discover the value of the private key.

In addition, the secured object includes the message digest of the banking application coupled with the data-collection module. The digital signature ensures that no man-in-application or man-in-middle can change the message digest in transmission. So, when the server receives the antiTamper-md, the server may check to ensure that the data-collection module linked to a correctly authorized application.

Secured Object Replay Protection: The recipient receives an secured object in exactly one of the following three conditions:

The timestamp of the secured object is not in the future from the perspective of the recipient AND the timestamp has not expired.

The timestamp has expired

The timestamp is in the future

Since a timestamp is a distinct point, it must reside within exactly one of the three conditions. However, the server rejects any incoming message unless the timestamp satisfies the first condition. Within this condition, the server uses its message ID cache to protect against replay.

Cryptographic Performance Optimization

When a user opens a client app on a mobile device, the application initializes the data-collection module. On the first message that the data-collection module sends to the server, no facility for cryptographic optimization generally exists. However, on all subsequent messages, the data-collection module may optionally elect to optimize performance by eliminating asymmetric cryptographic operations. Since symmetric cryptography operates quickly, and asymmetric cryptography is typically relatively slow, the performance optimization may be substantial.

In some embodiments, in order to optimize performance, the data-collection module caches the cryptoheader of the first message in memory. The data-collection module reuses the cryptoheader on all subsequent messages in the session thereby avoiding re-wrapping the session key. The data-collection module may use the wrappedintegritykey in order to ensure the integrity of subsequent messages. Since the integrity key was signed in the first message, the protocol can protect against an attacker who attempts to use his or her own integrity key.

The cryptographic performance optimization has a security tradeoff. By caching keys, the data-collection module may be more vulnerable to attack because multiple messages are encrypted with the same key. Furthermore, by reusing symmetric keys the cryptographic assurance may not be quite as high as using a unique symmetric key on every message.

Information Object

The information object contains the information required to drive the various authentication semantics. Each information object has a type-header which describes its purpose. The remainder of the information object contains information specific to its type.

Information Object Format: The format of an information object according to some embodiments is shown below. The format can be an array of one or more "appObj".

```
{
{"appObjList":[{"appObj":{...},"appObj":{...}}}
}
Each "appObj" is one of:
{"registration":
    {"publicKey":"7979070987809",
    "status":"new",
```

```
        "appID":"839458",   // globally unique AppID
        "pid":"234234"}     // pid = permanentID
    }
{"version":["malware x.y.z"]},
{"malwareresult":
    {"result":"yes",
     "findings":"["namesofmalware"]}
}
{"rootresult":
    {"result":"no",
     "findings":"..."}
}
{"analysisresult":
    [{"analysisType":"heartbleed",
      "status":"found",
      "comments":"xyz"}]
}
{"log":
    {"logname":"batterylog",
     "log":"logdata",
     "status":"success"}
}
{"certificatepin":
    {
     "cert":"3434",
     "cert-md":"123"}
}
{"malwareSignatureList":
    {"version":"4.5.9",
     "timeformat":" ISO8601",
     "time":" 2014-07-03T09:24:31+05:00",
         "entry": [{
         "name":" iBanking",
         "hashvalue":" d729230238",
         "installedPackageName":"com.evilsunflower.compass",
         }],
     }
}
{"rootSignatureList":
    {"version":"8.3.9",
     "timeformat":" ISO8601",
     "time":" 2014-07-03T09:24:31+05:00",
     "entry": [{
         "Type":"Super User",
         "Installed Package Name":"com.noshufou.android.su.elite",
         }],
     }
}
{"BadList":
    {"version":"4.5.9",
     "timeformat":" ISO8601",
     "time":" 2014-07-03T09:24:31+05:00",
     "entry": [{
         "id":"8769867",
         "Provenance":"Tier1Fl",
         "Surety":"login denial",
         "ReasonCode":["released fraudulent transaction",
         "rooted device"],
         ]},
     }
}
{"GoodList":
    {"version":"4.5.9",
     "timeformat":" ISO8601",
     "time":" 2014-07-03T09:24:31+05:00",
     "entry": [{
         "id":"7678",
         "ReasonCode":["used in valid transaction"],
         ]},
     }
}
{"unregister":
    }
}
```

Information Object Process

Two options exist for communicating an information object as illustrated in FIG. 27 below. The diagrams illustrate a transmission that originates in the data-collection module and terminates at the authorization server, with the service provider's client and/or server/dispatcher as untrusted intermediaries, Both diagrams illustrate secured objects that communicate from the data-collection module to the server.

The two diagram differ, however; at the point in which they format the information object. In the diagram on the left, the data-collection module populates the secured object with raw data such as an unmodified log file. Upon reception, the Server unpacks the secured object, and then parses the raw data to form the information object. In the diagram on the right, the data-collection module first parses the raw data to form an information object, and then the data-collection module inserts the information object into the secured object.

Regardless of the chosen option, the result is generally the same: the authentication server receives an information object. The architectural choice is left to a software system developer. The advantage of the approach on the left is that it offloads processing cycles onto the users' devices. The advantage of the approach on the right is that it allows for simpler application code to be installed onto the device thereby facilitating debugging and updates.

Install:

In some embodiments, when a user first installs a client app, the app invokes the install service. The install service creates a non-volatile file using the cryptographic protection mechanisms called appid. The install service creates a 256-bit number and inserts this number into this file. The purpose of the appID is to ensure separation when multiple protected client applications reside on the same device. This can avoid the possibility of one application attacking another by confusing keys. In some embodiments, the master keys are generated by referencing an appID corresponding to a client app, and other information collected from the user device. In this way, each client application operating on a single user device can have different master keys.

In some embodiments, when a user runs the client app invoke the data-collection module's init service immediately. The init service polls the authentication server to determine if any new configuration files (e.g., malware and root signature files) exist and have not yet been installed. The init service can install the configuration files prior to exchange of information for user authentication.

Root Detection:

In some embodiments, root detection exports an API that has no input parameters. As an output parameter, the root detection API produces an secured object that contains an information object of the rootResult type. The root detection service first searches the device for indication of root access:

1. In some embodiments, the data-collection module, includes software that implements isRootAvailable( ) and isRootAccessGiven( ). These routines can be effective is identifying evidence of root access.

2. Search for root or superuser-like applications and see if they are currently running.

3. Find root hiders and see if they are running.

4. Find root related applications (apps installed only with rooted phones) and see if they are running 5. check if ro.secure flag was changed 6. find root if related directories are created This search produces a Boolean result coupled with a description. The service may generate an information object having a type "rootResult" populated with the result and findings from the search. Next, the root detection service may pass the rootResult to the data-collection module, which can generate a corresponding secured object for transmission of the root results to the authentication server.

Malware Detection:

In some embodiments, malware detection exports an API that has no input parameters. As an output parameter, the malware detection API produces a secured object that contains an information object of the malwareResult type. The malware detection service first looks into the local sandbox of the application to find a malware signature file. If the malware signature file does not exist or has expired, then the malware detection returns an error. The malware detection service is not responsible for obtaining the malware signature file in some embodiments. After obtaining the malware signature file, the malware detection uses the services of the security module to check tamper by validating the digital signature of the malware signature file. This check protects against man-in-application attacks that corrupt files in the application's sandbox.

Parse the malware and then search the device to determine if any application installed and/or running on the device has a message digest that equals a value in the malware signature file. This search may produce a Boolean result coupled with a description. This result can be included as an information object of type malware result, which may then be included in a secured object, and transmitted to an authentication server.

Location Detection

Location Services Implemented in the Data-Collection Module: The data-collection module may collect one or more of the following types of location-related information to send to the server.

Cell tower: Query the device for the physically closest cell phone towers, and upload to the server.

WIFI: Identify the SSID and MAC address using the same functions as required to obtain cell phone data.

DNS: Obtain a GIF image that has no display. Query the DNS for the domain name, where the DNS resolves to the ISP. The ISP then resolves to the domain server, thereby providing the location of the ISP's DNS.

GPS: Query the GPS coordinates.

Location Services implemented in the Authentication Server: In some embodiments, the authentication server may implement the following logics:

Cell tower: Upon receipt of the cell tower data from the device, lookup in a database. The database cross references between cell tower names and geographical locations. The server resolves against this database to provide the location.

Wifi: The server's WIFI solution is the same as the cell tower. When possible, use a service with both cell tower and wifi information.

Debugger/Emulator

The presence of a debugger and/or an emulator on a client device may suggest that the client app, the data-collection module, and/or the security module is compromised or tampered with. In some embodiments, the data-collection module can detect if a debugger and/or an emulator is attached to a client app, the data-collection module, and/or the security module. If the presence of a debugger and/or an emulator is detected, that information may be sent via a secured object to an authentication server.

Certificate Pinning

The purpose of the certificate pinning service is to detect an intermediate proxy which may interrupt, modify, or view confidential information. In some embodiments, the Certificate Pinning service can be redundant because the secured object already addresses the security requirements as discussed above. However, the Certificate Pinning service may be useful to the client app itself because the client app may rely upon mechanisms other than secured objects, such as HTTPS for protecting its communication. For example, if an online banking service were to pass bank account numbers, credit card numbers, or passwords over the Internet, then the banking service would need an assurance that the HTTPS connection is secure.

In some embodiments, the certificate pinning service operates over the trusted path offered by a secured object. The certificate pinning service exports an API that has no input parameter. If invoked, the certificate pinning service creates a secured object, and populates the secured object with an information object of the certificate type. The Certificate Pinning service has the choice of either populating the information object with the entire certificate, or the message digest of the certificate. The certificate pinning service returns the secured object that contains the information object as an output parameter.

The certificate pinning service looks into the SSL connection object in Android or IOS to find the certificate of the current SSL or TLS session. Then, the certificate pinning service writes this certificate or message digest into the information object.

Registration

Registration exports an API that accepts a filename as a parameter. The filename has the name of a data key in the sandbox. As an output parameter, the registration API produces a secured object that contains an information object which includes the data key. The registration service first looks in the application's sandbox to see if files exist representing the private key. If the file does not exist, then the registration service forms a new asymmetric key pair and populates the files. Next, the registration service collects the Permanent ID (PID) of the device by invoking the permanent id service.

The registration service uses the services exported by the security module to create encrypted and signed files in the application's sandbox holding the private key and clientID (ID of a client app or a server). The registration service builds an information object by populating the respective fields. Lastly the registration service builds and sends a secure object that includes the information object, that includes the new public key and the corresponding permanent device ID. The status value can be "new" indicating a registration of a new device, a device for which the application was uninstalled and then re-installed, or a device which has been wiped or reset.

Re-Registration

Re-registration accepts a filename, fname, as an input parameter, where the filename represents the data key which holds the asymmetric key pair for the device. This process can use the data-collection nodule's delete(•) method to destroy evidence of a previous registration by deleting any old files with the same name.

The data-collection module can then create a new asymmetric key pair, and store it in the sandbox of the client app using the security module, as described above. The data-collection module may build an information object including the re-registration information (e.g., including the newly generated key pair). Using the information object, the data-collection module can build and transmit a secured object to an authentication server.

Un-Registration

A reset or un register operation deletes the files in the client's sandbox representing a private key. The data-collection module then builds an information object of type unregister, builds a corresponding secured object, and sends that object to an authentication server. The data-collection module may follow a similar process as the re-registration service to clean up non-volatile files holding old keys.

Version

Version exports an API that has no input or output parameters. As an output parameter, version produces an secured object that contains an array of version numbers of IA Files, e.g., malware signature file, root signature file, and log configuration file. Each version number additionally includes the file's name (type).

Permanent ID

The service creates the Permanent ID (PID) of the device.

ANDROID: On the ANDROID operating system, the components of the PID are: MEID (mobile equipment identifier) and other values extracted from the device. The server processes the Android_ID separately from the other components because the Android_ID does not survive data wipes. However, the server uses the Android_ID as a redundant check. If the server detects that the Android_ID changed when the other components remained unchanged, then the server executes its exception processing algorithms.

The service creates the following JSON object:

```
{
    {"pid":
        {"meid":"0980980",
        },
    },
}
```

Next, the service uses the canonicalize( ) method to convert into a serializable string (see HLD). Next, the service creates the message digest over the canonicalized method to form the pid. The service returns this pid as the result.

IOS: The service implements the IOS's pid method similarly to the Android method, by creating a JSON object of the components, canonicalizing, and then returning the message digest.

MessageID Maintenance

The MessageID maintenance service helps protect against playback attacks for messages sent from the server-to-data-collection module. As described above, the recipient may discard secured objects that are older than the threshold or secured objects that have a future timestamp. Within the span of the threshold, the recipient may check that it receives no particular messageID twice. Additionally, the recipient can check that no secured object contains a messageid with a version number less than the highest version number so far received.

When the recipient is the server, the solution is relatively straight-forward. The recipient maintains a list of message-IDs received from each data-collection module in a secure database; and the server validates each incoming messageID upon receipt. However, when the recipient is the data-collection module, no easily-secured database exists to manage the history of received messageIDs. Instead, the data-collection module manages the history in a file (called msgid.txt in some embodiments) in the application sandbox; and protects the file using the non-volatile cryptographic mechanisms described in above. Whenever the data-collection module receives an secured object from the server, the data-collection module checks the timestamp against the threshold, and then checks the messageID of the secured object against the list stored in msgid.txt. Additionally, the data-collection module checks to ensure that it has no messageID with a later version number than the incoming secured object.

An attacker probably lacks the ability to break through the file's cryptographic protections. So, msgid.txt forgery is not highly probable. However, the adversary may attempt some simpler attacks:

Delete the msgid.txt file

Overwrite the msgid.txt file with an older version

These attacks require no cryptography, but both can defeat the anti-playback protection as illustrated in below. The attack illustrates a two legitimate messages transmitted from the server to the data-collection module labeled 1 and 2 respectively. However, the adversary restores the historical msgid.txt which existed after receipt of the first secured object but prior to the receipt of the second secured object. At this point, the adversary can replay the second secured object thereby defeating the anti-replay mechanism.

The data-collection module combats against this attack using the messageid-history which contains the historical list of messageIDs received by the data-collection module, Upon receipt, the server validates the history of histories to ensure that that the history grows for each data-collection module. The server permits the data-collection module to discard a messageid from the historical list in the secured object if the messageid were to have preceded the threshold; however, the history list must contain all messageids that are still within the current threshold period. If the server observes missing messageids, then the server raises an exception.

In some embodiments, once decrypted, the format of the msgid.txt file is a two column list. The first column has messageIDs, and the second column has the date-timestamp of the messageID. The messageID maintenance service ensures that the msgid.txt file is always sorted with the most recent messageid first. Whenever the data-collection module returns a secured object, the data-collection module reads the msgid.txt file to find all the messageIDs since the last timestamp, and inserts the messageIDs into the messageid-history of the secured object.

As such, the authentication server can verify that the last message ID(s) it sent to a data-collection module are returned in a subsequent message. If those message ID(s) are not returned, the authentication server may conclude that an attacker deleted the message ID history on the user device sandbox and/or replaced the message ID history with an older version. Upon this detection, the server can detect the possibility of a replay attack and/or tampering, and may take appropriate action.

Trust Model

Figure 28:
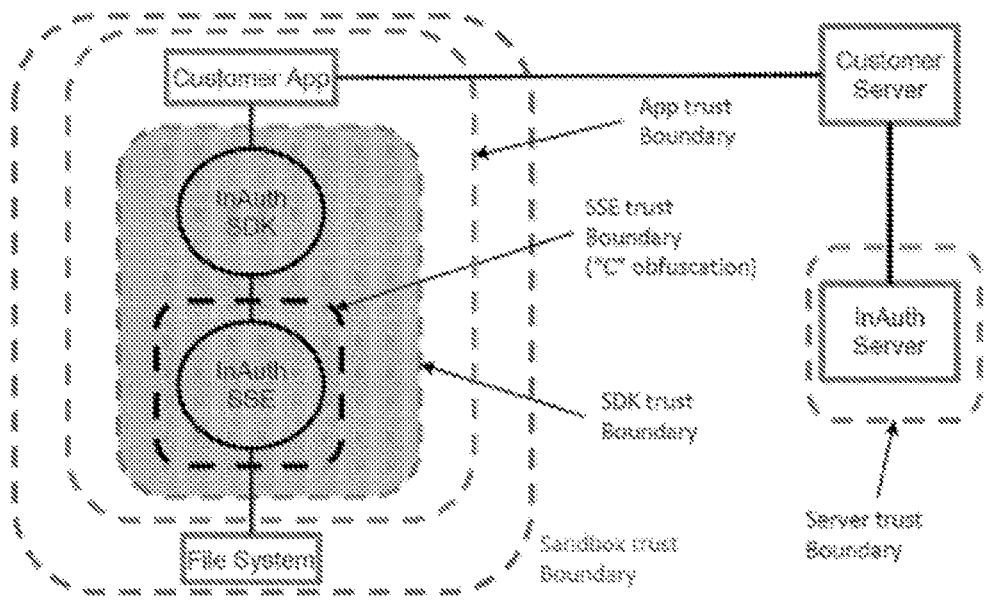
FIG. 28 illustrates a trust model providing a different method of protection at each trust boundary, according to some embodiments.

FIG. 28 illustrates a trust model according to some embodiments. The environment provides a different method of protection at each trust boundary, as described below.

Security module trust boundary: In some embodiments, the security module may be implemented in "C" because the "C" language offers many opportunities for obfuscation and anti-tamper, and cannot be reverse engineered easily. The security module may be implemented, however, using other high level languages such as Objective-C, JAVA, etc. An adversary may encounter extreme difficulty in viewing confidential information such as cryptographic keys in memory or modifying the execution of the security module when that module is obfuscated.

The security module can cryptographically protects information from unauthorized disclosure or modification before writing to the local non-volatile sandbox file system. In some embodiments, each file has a unique per-file key. No two devices and/or no two client apps installed on a single device may share the same non-volatile storage key. Each non-volatile storage key itself may be encrypted one or more times to form a key hierarchy. Each level of the key hierarchy can use a different method of protection thereby forcing a potential adversary to execute many attacks simultaneously, while requiring different attack methods at each level of the encryption hierarchy, making unauthorized access to a key extremely difficult if not impossible.

Data-collection module trust boundary: In some embodiments, the data-collection module does not permit access to any cryptographic keys outside the boundary of the data-collection module or the boundary of the security module. Implementation of the data-collection module may also be provided with obfuscation protection.

Client app trust boundary: A service provide may link its client application to the data-collection module.

Sandbox trust boundary: In some embodiments, the data-collection module implements root and malware detection. If malware attempts to jump the sandbox boundary and access the client application's protected sandbox, a detective control implemented in the data-collection module and/or the security module may raise a flag. The data-collection module may upload the flag through a trusted path to a server in order to ensure that the server obtains correct and timely information. The integrity-protection mechanism offered through the secured object's signature can protect against unauthorized modification of this flag. The secured object's anti-replay mechanism can protect against a replay of an old message that was generated presumably prior to the detected infection.

Server trust boundary: The authentication (also called authorization) server typically resides in the application's data center, and is protected using sophisticated security systems.

In some embodiments, one or more of the operations that may be performed by a data-collection module may instead or in addition to the data-collection module be performed by the security module. Examples of such operations include generation/encryption/decryption of a secured object, generation/encryption/decryption of an information object, generation/encryption/decryption of one or more headers of the secured object, performing anti-replay and/or anti-tamper checks, etc. The information object may include a permanent ID of a user device, location data, results of malware check, root check, etc. If the security module generates an information object and/or a secured object, the information contained therein need not leave the boundary of the security module.

Server-to-Data-Collection Module Communication Model

Once the server creates a config file, the server packs the config file into an secured object, and then posts the secured object on the web server. Whenever an application starts up, the application can obtain all of the posted secured objects, that include the config file(s). A config file may include information such as message ID, version number, whitelist for logging service, blacklist of apps that should not be present on a user device, a list of apps to scan to detect a rooted device, and/or a list of malware.

In some embodiments, the data-collection module looks into its message ID file to see which secured objects were already installed. For these repeats, the data-collection module simply discards. Otherwise, the data-collection module accepts the posted secured object, updates msgid.txt, and places the configuration file into the sandbox using the non-volatile cryptographic protections as described above.

If the server receives a secured object with an outdated messageid-history, then the server blocks further processing and returns an error. The client app may shut down and restart. Upon restart, the client app may install the latest secured objects into the data-collection module. In some embodiments, the format of each configuration file is a SAML assertion, as described below:

ID: The ID is messageid of the secured object that holds the configuration file. Upon receipt, the data-collection module verifies to ensure that the ID and the messageID match. Otherwise, the data-collection module discards the secured object. If the validations succeed, then the data-collection module stores the entire configuration file (including its SAML header) in the sandbox using the cryptographic protections. The filename is the ID. The data-collection module does not delete any configuration files until the next time that the server increases its version number of the messageid in the secured object.

IssueInstant: The IssueInstant field defines a time and date stamp which marks when the server first publishes the configuration file version. When the application start up, the application reads and decrypts the configuration files in the sandbox. Whenever two configuration files each contain the same type of information, the data-collection module selects the configuration file with the latest IssueStatement. The data-collection module may delete the old configuration file from its sandbox.

Version: The version field is reserved by SAML. Some embodiments use the value "2,0".

Issuer: The issuer is the name of the party who issued the configuration file, such as the authentication or service provider's server.

Subject: The purpose of the subject field is to provide different configuration files to each end-user. When not used, the subject field has a transient identifier which can change on every new version of a configuration file.

Conditions: The conditions field marks a NotBefore and NotAfter time and date stamp. These fields allow the data-collection module to immediately identify an error if the data collection module were to use a configuration file that does not satisfy its conditions, AttributeStatement: The AttributeStatement contains the configuration file. Each configuration file resides within its own attribute. The server may submit multiple attributes in the same SAML token, or split into separate SAML tokens. Each secured object may not hold more than one SAML token.

The types of configuration files are described below:

White List: The example below depicts a White List that covers the accelerometer and location logs. The data-collection module may collect only these logs related to accelerometer and location, and submit to the server. The data-collection module may not collect no other logs.

```
<saml:Attribute Name="IAWhiteList">
    <saml:AttributeValue>accelerometer</saml:AttributeValue>
    <saml:AttributeValue>location</saml:AttributeValue>
</saml:Attribute>
```

Malware Signature List: The example below depicts a Malware Signature List. The data-collection module may search for the specified malware.

```
<saml:Attribute Name="MalwareSignatureList">
    <saml:AttributeValue>
        <malware>org.magicalguru.flashforward</malware>
        <md5>97465b4f74dafd2e584f576a67c5354b</md5>
    </saml:AttributeValue>
    <saml:AttributeValue>
        <malware>ocom.evilsunflower.xiaoxiaole</malware>
        <md5>6bd9363c5d86e1f75ecb61556451363b</md5>
    </saml:AttributeValue>
</saml:Attribute>
```

Root Signature List: The root attribute of the root signature list defines the name of a particular installation for which the data-collection module may search. The weight depicts the relative importance. Higher weight values represent greater importance, in some embodiments. Roottest is a special attribute which defines a specific test

```
<saml:Attribute Name="RootList">
    <saml:AttributeValue>
        <root>com.noshufou.android.su</root>
        <weight>2</weight>
    </saml:AttributeValue>
    <saml:AttributeValue>
        <root>cfahrbot.apps.rootcallblocker.pro</root>
        <weight>1</weight>
    </saml:AttributeValue>
    <saml:AttributeValue>
        <roottest>
            sync_agent ztex1609523 \#xD id \#xD \#x22
hello \#x22 >>/data/data/testin.txt \#xD rm /data/data/testin.txt
        </roottest>
        <weight>4</weight>
    </saml:AttributeValue>
</saml:Attribute>
```

Blacklist: The system identifies three types of blacklists:
Phish: list of banned e-mail addresses. Scan for communication with these addresses.
Smish: list of banned phone numbers. Scan for SMS text messages with these numbers.
Device: List of banned devices. For each device, identify the pid, provenance, surety, and reason for banning.

```
<saml:Attribute Name="IABlackList">
    <saml:AttributeValue>
        <phish>bad@hacker.com</phish>
    </saml:AttributeValue>
    <saml:AttributeValue>
        <phish>verybad@evil.com</phish>
    </saml:AttributeValue>
    <saml:AttributeValue>
        <smish>1-1234567890</smish>
    </saml:AttributeValue>
    <saml:AttributeValue>
        <device>
            <pid>097800876</pid>
            <provenance>FI-classA</provenance>
            <surety>suspended</surety>
            <reason>fraudulent payment</reason>
        </device>
    </saml:AttributeValue>
</saml:AttributeValue>
```

As described herein, using secured objects for communication in either or both directions, a trusted path can be established between a client and a server. In various embodiments, a trusted path can offer end-to-end security, and solutions to pitfalls that may befall other techniques. In comparison, HTTPS has multiple deficiencies such as:
HTTPS generally does not offer message-oriented replay protection. For example, an adversary may potentially replay an old root or malware detection result through an existing HTTPS channel.
HTTPS normally authenticates only a single side of the communication channel
Numerous HTTPS vulnerabilities were uncovered in recent years.
Encryption gaps in a datacenter's DMZ (also called perimeter) or internal networks may render cryptographic gaps when using HTTPS.
HTTPS generally does not offer non-repudiation
In various embodiments, the trusted path architecture can protect against many different attack classes:
Protection against key discovery: In some embodiments, asymmetric private keys never export out of the security module and/or the data-collection module implemented in an obfuscated manner; each private key may have multiple layers of key wrapping/encryption.
Protection against key modification: In some embodiments, each key has its own key wrapping/encryption hierarchy.
Protection against signing with a compromised key: In some embodiments, the security module can self-validate its own integrity and/or whether a data-collection module and/or a client app (and even a server) was tampered with. As such, an adversary cannot masquerade as a data-collection module and/or a client app without breaking the integrity control.
Setup or provision adversary's key: In some embodiments, the messaging solution offers opportunities to orchestrate an onboarding flow that leverages authentication via a trusted path. For example, the service provider may authenticate a password before onboarding a user device such as a smart phone, a tablet computer, a laptop, a desktop, etc.
Protection against a replay attack: In some embodiments, the security module can validate communicated secured objects and/or encrypted files in the sandbox to protect against unauthorized replay.

The various embodiments and features described herein may be used in any combination, as the combination of these embodiments and features are well within the scope of the invention. While the foregoing description includes many details and specificities, it is to be understood that these have been included for purposes of explanation only, and are not to be interpreted as limitations of the present invention. It will be apparent to those skilled in the art that other modifications to the embodiments described above can be made without departing from the spirit and scope of the invention. Accordingly, such modifications are considered within the scope of the invention as intended to be encompassed by the claims presented below and their legal equivalents.

It is clear that there are many ways to configure the device and/or system components, interfaces, communication links, and methods described herein. The disclosed methods, devices, and systems can be deployed on convenient processor platforms, including network servers, personal and portable computers, and/or other processing platforms. Other platforms can be contemplated as processing capabilities improve, including personal digital assistants, computerized watches, cellular phones and/or other portable devices. The disclosed methods and systems can be integrated with known network management systems and methods. The disclosed methods and systems can operate as an SNMP agent, and can be configured with the IP address of a remote machine running a conformant management platform. Therefore, the scope of the disclosed methods and systems are not limited by the examples given herein, but can include the full scope of the claims and their legal equivalents.

The methods, devices, and systems described herein are not limited to a particular hardware or software configuration, and may find applicability in many computing or processing environments. The methods, devices, and systems can be implemented in hardware or software, or a combination of hardware and software. The methods, devices, and systems can be implemented in one or more computer programs, where a computer program can be understood to include one or more processor executable instructions. The computer program(s) can execute on one or more programmable processing elements or machines, and can be stored on one or more storage medium readable by the processor (including volatile and non-volatile memory and/or storage elements), one or more input devices, and/or one or more output devices. The processing elements/machines thus can access one or more input devices to obtain input data, and can access one or more output devices to communicate output data. The input and/or output devices can include one or more of the following: Random Access Memory (RAM), Redundant Array of Independent Disks (RAID), floppy drive, CD, DVD, magnetic disk, internal hard drive, external hard drive, memory stick, or other storage device capable of being accessed by a processing element as provided herein, where such aforementioned examples are not exhaustive, and are for illustration and not limitation.

The computer program(s) can be implemented using one or more high level procedural or object-oriented programming languages to communicate with a computer system; however, the program(s) can be implemented in assembly or machine language, if desired. The language can be compiled or interpreted. Sets and subsets, in general, include one or more members.

As provided herein, the processor(s) and/or processing elements can thus be embedded in one or more devices that can be operated independently or together in a networked environment, where the network can include, for example, a Local Area Network (LAN), wide area network (WAN), and/or can include an intranet and/or the Internet and/or another network. The network(s) can be wired or wireless or a combination thereof and can use one or more communication protocols to facilitate communication between the different processors/processing elements. The processors can be configured for distributed processing and can utilize, in some embodiments, a client-server model as needed. Accordingly, the methods, devices, and systems can utilize multiple processors and/or processor devices, and the processor/processing element instructions can be divided amongst such single or multiple processor/devices/processing elements.

The device(s) or computer systems that integrate with the processor(s)/processing element(s) can include, for example, a personal computer(s), workstation (e.g., Dell, HP), personal digital assistant (PDA), handheld device such as cellular telephone, laptop, handheld, or another device capable of being integrated with a processor(s) that can operate as provided herein. Accordingly, the devices provided herein are not exhaustive and are provided for illustration and not limitation.

References to "a processor", or "a processing element," "the processor," and "the processing element" can be understood to include one or more microprocessors that can communicate in a stand-alone and/or a distributed environment(s), and can thus can be configured to communicate via wired or wireless communication with other processors, where such one or more processor can be configured to operate on one or more processor/processing elements-controlled devices that can be similar or different devices, Use of such "microprocessor," "processor," or "processing element" terminology can thus also be understood to include a central processing unit, an arithmetic logic unit, an application-specific integrated circuit (IC), and/or a task engine, with such examples provided for illustration and not limitation.

Furthermore, references to memory, unless otherwise specified, can include one or more processor-readable and accessible memory elements and/or components that can be internal to the processor-controlled device, external to the processor-controlled device, and/or can be accessed via a wired or wireless network using a variety of communication protocols, and unless otherwise specified, can be arranged to include a combination of external and internal memory devices, where such memory can be contiguous and/or partitioned based on the application. For example, the memory can be a flash drive, a computer disc, CD/DVD, distributed memory, etc. References to structures include links, queues, graphs, trees, and such structures are provided for illustration and not limitation. References herein to instructions or executable instructions, in accordance with the above, can be understood to include programmable hardware.

Although the methods and systems have been described relative to specific embodiments thereof, they are not so limited. As such, many modifications and variations may become apparent in light of the above teachings. Many additional changes in the details, materials, and arrangement of parts, herein described and illustrated, can be made by those skilled in the art. Accordingly, it will be understood that the methods, devices, and systems provided herein are not to be limited to the embodiments disclosed herein, can include practices otherwise than specifically described, and are to be interpreted as broadly as allowed under the law.

What is claimed:

1. A method, comprising:
  receiving, by at least one computing device, device data from a client device, the device data comprising a plurality of device attributes;
  identifying, by the at least one computing device, a key attribute and a set of other device attributes in the plurality of device attributes in response to an analysis of the plurality of device attributes, the key attribute comprising a public key used to validate a digital signature of a secured object sent from the client device;
  querying, by the at least one computing device, a database using the key attribute and the set of other device attributes;
  determining, by the at least one computing device, that the database contains at least one of at least one device attribute from the set of other device attributes and fails to include the key attribute;
  accessing, by the at least one computing device, a record that corresponds to the at least one device attribute from the set of other device attributes and comprises a device identifier (DID);
  updating, by the at least one computing device, the record with the public key for the client device; and
  providing, by the at least one computing device, the DID in the record as an identifier of the client device.

2. The method of claim 1, wherein the plurality of device attributes comprise at least one of a phone number, a mobile equipment identifier, a parameter of an operating system installed on the client device, a model number of the client device, a serial number of the client device, a device characteristic, a public key allocated to the client device, or a public key installed on the client device.

3. The method of claim 1, wherein receiving the device data from the client device comprises receiving the device data via a digitally signed message.

4. The method of claim 3, wherein the digitally signed message comprises: (i) an information object comprising the plurality of device attributes, (ii) a header object comprising an anti-replay header or an anti-tamper header, and (iii) an integrity object comprising a digital signature associated with the information object and the header object, the method further comprising: validating the information object based on the digital signature.

5. The method of claim 4, further comprising:
performing, via the at least one computing device, at least one of: (i) an anti-replay check, or (ii) an anti-tamper check; and
validating the information object according to a result of at least one of: (i) the anti-replay check, or (ii) the anti-tamper check.

6. The method of claim 1, wherein the record comprises a plurality of stored device attributes, the method further comprising:
comparing, by the at least one computing device, the set of other device attributes with the plurality of stored device attributes;
determining, by the at least one computing device, that a first attribute from the set of other device attributes fails to match with a corresponding stored attribute; and
updating, by the at least one computing device, the corresponding stored attribute with the first attribute.

7. The method of claim 1, further comprising determining a confidence score associated a risk for the client device based at least in part on an analysis of the set of other device attributes.

8. The method of claim 7, further comprising determining, by the at least one computing device, that the client device is not a risky device based at least in part on the confidence score meeting or exceeding a predefined threshold value.

9. A system, comprising:
at least one computing device;
at least one application executable on the at least one computing device, wherein, when executed, the at least one application causes the at least one computing device to at least:
receive device data from a client device, the device data comprising a plurality of device attributes;
identify a key attribute and a set of other device attributes in the plurality of device attributes in response to an analysis of the plurality of device attributes, the key attribute comprising a public key used to validate a digital signature of a secured object sent from the client device;
query a database using the key attribute and the set of other device attributes;
determine that the database fails to include the key attribute and at least one of the set of other device attributes;
create a device identifier (DID) and a record comprising the DID, the public key, and the set of other device attributes;
determine a confidence score associated a risk for the client device based at least in part on an analysis of the set of other device attributes;
associate the confidence score with the DID;
store the record in the database; and
provide the DID as an identifier of the client device.

10. The system of claim 9, wherein the plurality of device attributes comprise at least one of a phone number, a mobile equipment identifier, a parameter of an operating system installed on the client device, a model number of the client device, a serial number of the client device, a device characteristic, a public key allocated to the device, or a public key installed on the client device.

11. The system of claim 9, wherein receiving the device data from the client device comprises receiving the device data via a digitally signed message.

12. The system of claim 11, wherein the digitally signed message comprises: (i) an information object comprising the plurality of device attributes, (ii) a header object comprising an anti-replay header or an anti-tamper header, and (iii) an integrity object comprising a digital signature associated with the information object and the header object, and, when executed, the at least one application further causes the at least one computing device to at least validate the information object based on the digital signature.

13. The system of claim 12, further comprising:
performing, via the at least one computing device, at least one of: (i) an anti-replay check, or (ii) an anti-tamper check; and
validating the information object according to a result of at least one of: (i) the anti-replay check, or (ii) the anti-tamper check.

14. The system of claim 9, wherein, when executed, the at least one application causes the at least one computing device to at least:
register the client device in response to the confidence score being above a predefined threshold.

15. The system of claim 9, wherein the confidence score is based at least in part on a compatibility analysis of individual device attributes of the plurality of device attributes with one another.

16. A non-transitory computer-readable medium embodying a program executable in at least one computing device, wherein when executed, the program causes the at least one computing device to at least:
receive device data from a client device, the device data comprising a plurality of device attributes;
extract a key attribute and a set of other device attributes in the plurality of device attributes, the key attribute comprising a public key used to validate a digital signature of a secured object sent from the client device;
query a database using the key attribute and the set of other device attributes;
determine whether the database contains at least one of at least one device attribute from the set of other device attributes or the key attribute;
access a record that corresponds to the at least one device attribute from the set of other device attributes and comprises a device identifier (DID);
update the record with the public key for the client device;
provide the DID in the record as an identifier of the client device;
create a new DID and a new record comprising the new DID, the public key, and the set of other device attributes;
store the new record in the database; and
provide the new DID as the identifier of the client device, wherein accessing the record, updating the record, and providing the DID are performed in response to determining that the database contains the at least one device attribute from the set of other device attributes and that the database fails to include the public key, and wherein creating the new DID and the new record, storing the new DID, and providing the new DID are performed in response to determining that the database fails to contain the public key and the at least one device attribute from the set of other device attributes.

17. The non-transitory computer-readable medium of claim 16, wherein, when executed, the program further causes the at least one computing device to at least access from the database a record that corresponds to the public key and comprises the DID in response to determining that the database includes the public key.

18. The non-transitory computer-readable medium of claim 16, wherein the plurality of device attributes comprise at least one of a phone number, a mobile equipment identifier, a parameter of an operating system installed on the device, a model number of the device, a serial number of the device, a device characteristic, a public key allocated to the device, or a public key installed on the device.

19. The non-transitory computer-readable medium of claim 16, wherein creating the new DID comprises generating the new DID using at least one of a random number generator or a pseudo-random number generator.

20. The non-transitory computer-readable medium of claim 16, wherein, when executed, the program causes the at least one computing device to at least generate a confidence score associated a risk for the client device based at least in part on an analysis of the set of other device attributes.

\* \* \* \* \*